United States Patent
Gabai et al.

(10) Patent No.: US 9,978,267 B2
(45) Date of Patent: May 22, 2018

(54) SYSTEMS AND METHODS USING ACOUSTIC COMMUNICATION

(71) Applicant: WIZEDSP LTD., Tel-Aviv (IL)

(72) Inventors: Oz Gabai, Tel-Aviv (IL); Haim Primo, Ganey Tikva (IL)

(73) Assignee: WIZEDSP LTD., Tel-Aviv (IL)

( * ) Notice: Subject to any disclaimer, the term of this patent is extended or adjusted under 35 U.S.C. 154(b) by 0 days. days.

(21) Appl. No.: 14/905,972

(22) PCT Filed: Jul. 21, 2014

(86) PCT No.: PCT/IB2014/063266
§ 371 (c)(1),
(2) Date: Jan. 19, 2016

(87) PCT Pub. No.: WO2015/011624
PCT Pub. Date: Jan. 29, 2015

(65) Prior Publication Data
US 2016/0155324 A1    Jun. 2, 2016

Related U.S. Application Data

(60) Provisional application No. 61/856,729, filed on Jul. 21, 2013, provisional application No. 61/856,730, (Continued)

(51) Int. Cl.
*G08C 23/02* (2006.01)
*G10L 15/22* (2006.01)
*H04N 21/4363* (2011.01)
*H04N 5/44* (2011.01)
*H04N 5/445* (2011.01)
*H04N 21/485* (2011.01)
(Continued)

(52) U.S. Cl.
CPC ............. *G08C 23/02* (2013.01); *G08C 17/02* (2013.01); *G10L 15/22* (2013.01); *H04N 5/4403* (2013.01); *H04N 5/44513* (2013.01); *H04N 21/4126* (2013.01); *H04N 21/42222* (2013.01); *H04N 21/4394* (2013.01); *H04N 21/43615* (2013.01); *H04N 21/43637* (2013.01); *H04N 21/4852* (2013.01); *G10L 2015/223* (2013.01); *H04N 2005/4428* (2013.01); *H04N 2005/44517* (2013.01)

(58) Field of Classification Search
None
See application file for complete search history.

(56) References Cited

U.S. PATENT DOCUMENTS 6,389,055 B1    5/2002   August et al.
7,693,288 B2 *  4/2010   Mergler ................. G08C 19/28
                                                          381/105
(Continued)

*Primary Examiner* — Daniell L Negron
(74) *Attorney, Agent, or Firm* — Alphapatent Associates, Ltd; Daniel J. Swirsky

(57) ABSTRACT

A method and a system for remote controlling one or more service providing devices, including a mobile device operative to control a service providing device within a first range, where the mobile device is operative to interrogate the one or more service providing devices within a second range being smaller than the first range, where, responsive to the interrogation by the mobile device, the service providing device identifies itself to the mobile device, and where the mobile device is operative to present to a user a list including one or more of the service providing devices within the second range.

6 Claims, 27 Drawing Sheets

Related U.S. Application Data filed on Jul. 21, 2013, provisional application No. 62/021,018, filed on Jul. 4, 2014.

(51) Int. Cl.
*G08C 17/02* (2006.01)
*H04N 21/439* (2011.01)
*H04N 21/422* (2011.01)
*H04N 21/41* (2011.01)
*H04N 21/436* (2011.01)

(56) References Cited

U.S. PATENT DOCUMENTS

| | | |
|---|---|---|
| 2005/0172321 A1 | 8/2005 | Kakuda |
| 2005/0219068 A1 | 10/2005 | Jones et al. |
| 2006/0133414 A1 | 6/2006 | Luoma |
| 2006/0136544 A1 | 6/2006 | Atsmon et al. |
| 2007/0052675 A1 | 3/2007 | Chang |
| 2007/0254604 A1 | 11/2007 | Kim |
| 2008/0247757 A1* | 10/2008 | Um .................. G08C 23/04 398/106 |
| 2009/0210555 A1 | 8/2009 | Han |
| 2011/0273625 A1* | 11/2011 | McMahon ........... G06F 21/445 348/734 |
| 2012/0021684 A1 | 1/2012 | Schultz et al. |
| 2012/0214416 A1 | 8/2012 | Kent et al. |
| 2013/0093962 A1* | 4/2013 | Bruhn ................ G08C 17/02 348/734 |

\* cited by examiner

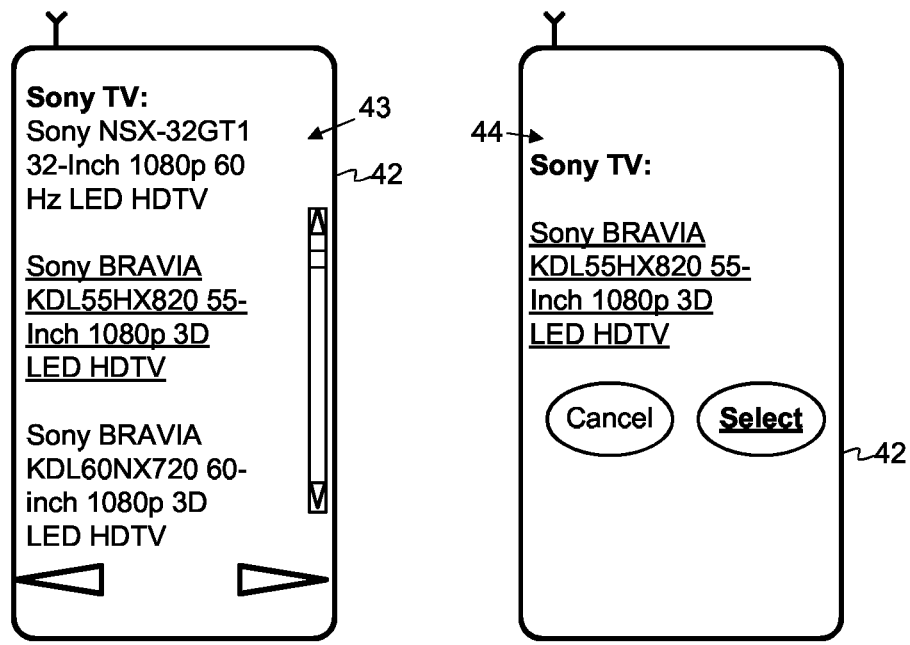
Fig. 9
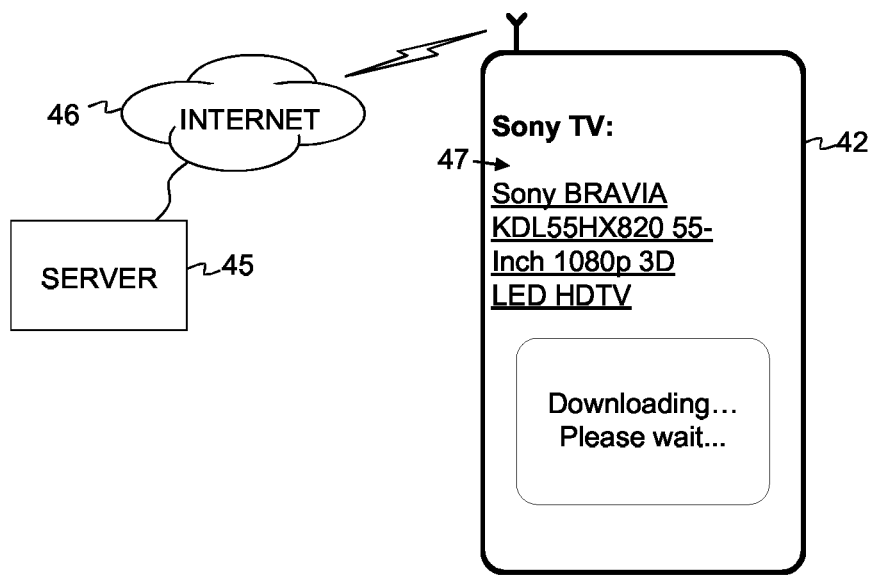

76

77

79

80

Kitty, Can you dance?

SYSTEMS AND METHODS USING ACOUSTIC COMMUNICATION

CROSS-REFERENCE TO RELATED APPLICATIONS

This application is a U.S. National Phase Application under 35 U.S.C. 371 of International Application No. PCT/IB2014/063266, which has an international filing date of Jul. 21, 2014, and which claims the priority benefit of U.S. Provisional Patent Application No. 61/856,729 and U.S. Provisional Patent Application No. 61/856,730, both filed Jul. 21,2013, and U.S. Provisional Patent Application No. 62/021,018 filed Jul. 4, 2014, which are all incorporated herein by reference.

FIELD AND OF THE INVENTION

The present invention generally relates to systems and methods using acoustic communication, and, more particularly, but not exclusively, to methods and systems for implementing personal area network (PAN) communication using acoustic technology.

BACKGROUND OF THE INVENTION

Personal area networks (PAN) and personal area communication technologies are known. Such communication networks and technologies provide data interchange at a range of few meters, typically between 1 meter and 10 meters. PAN communication technologies typically use radio waves or infra-red (IR) waves. Common radio PAN technologies are Bluetooth and Zigbee. IR communication technologies are mostly used for remote controls for their simplicity and because they do not penetrate room walls. However, IR communication technologies need at least near-line-of-sight between the transmitter and the receiver. Radio PAN technologies interfere with next door networks and therefore require complex network registration processes. Radio PAN technologies consume more power and are therefore useful mostly for rechargeable mobile units. Acoustic communication is also known, but only for very short range communication, typically within few centimeters. There is thus a recognized need for, and it would be highly advantageous to have, a method and a system for low power PAN networking that overcomes the abovementioned deficiencies.

SUMMARY OF THE INVENTION

Unless otherwise defined, all technical and scientific terms used herein have the same meaning as commonly understood by one of ordinary skill in the art to which this invention belongs. The materials, methods, and examples provided herein are illustrative only and not intended to be limiting. Except to the extent necessary or inherent in the processes themselves, no particular order to steps or stages of methods and processes described in this disclosure, including the figures, is intended or implied. In many cases the order of process steps may vary without changing the purpose or effect of the methods described.

Implementation of the method and system of the present invention involves performing or completing certain selected tasks or steps manually, automatically, or any combination thereof. Moreover, according to actual instrumentation and equipment of preferred embodiments of the method and system of the present invention, several selected steps could be implemented by hardware or by software on any operating system of any firmware or any combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

According to one aspect of the present invention there is provided a remote control method and system including one or more service providing device, and one or more mobile device operative to control one or more of the service providing device within a first range, where the mobile device is operative to interrogate the one or more service providing devices within a second range being smaller than the first range, where, responsive to the interrogation by the mobile device, the service providing device identifies itself to the mobile device, and where the mobile device is operative to present to a user a list including one or more of the service providing devices within the second range.

According to another aspect of the present invention there is provided a remote control system and/or method where the one or more mobile device and the one or more service providing device use a first wireless communication technology for communicating within the first range and a second wireless communication technology for communicating within the second range, where the second wireless communication technology is different from the first wireless communication technology.

According to yet another aspect of the present invention there is provided a remote control system and/or method where the mobile device and/or the service providing device additionally include a receiver module for receiving communication using the first wireless communication technology, a transmitter module for transmitting communication using the first wireless communication technology, a receiver module for receiving communication using the second wireless communication technology, and a transmitter module for transmitting communication using the second wireless communication technology.

According to still another aspect of the present invention there is provided a remote control system and/or method where one or more of the service providing device and the mobile device uses acoustic communication for the interrogation.

Further according to another aspect of the present invention there is provided a remote control system and/or method where the acoustic communication uses a speaker embedded in the service providing device and/or the mobile device and where the speaker is used to provide audible sound to a user, and a microphone embedded in the service providing device and the mobile device and where the microphone is used to receive audible sound from a user.

Yet further according to another aspect of the present invention there is provided a remote control system and/or method where the control of the service providing devices by the mobile device is conditioned by the service providing device being interrogated by the same mobile device.

Still further according to another aspect of the present invention there is provided a remote control system and/or method where the control of one or more of the service providing devices by the mobile device uses a code provided by the service providing device to the mobile device responsive to the interrogation.

Even further according to another aspect of the present invention there is provided a remote control system and/or method including a mobile device, and one or more local devices, where the local device is communicatively coupled to the mobile device, and where the local device is communicatively coupled to, and operative to control, one or more service providing devices, where the mobile device is operative to interrogate the one or more local devices within a limited range, where, responsive to the interrogation by the mobile device, the local device identifies the service providing device to the mobile device, and where the mobile device is operative to present to a user a list including one or more of the service providing devices within the limited range.

Also, according to another aspect of the present invention there is provided a remote control system and/or method where the local device is communicatively coupled to the mobile device using acoustic communication technology, and where the local device and the mobile device are one or more meter away from each other.

According to yet another aspect of the present invention there is provided a remote control system and/or method where the mobile device is a mobile telephone and the acoustic communication technology uses a microphone and a speaker of the mobile telephone.

According to still another aspect of the present invention there is provided a remote control system and/or method additionally including a second local device, located outside the limited range, and communicatively coupled to the first local device, where the mobile device is operative to interrogate the second local device via the first local device.

Further according to another aspect of the present invention there is provided a remote control system and/or method where the first and second local devices are communicatively coupled using any of Wi-Fi wireless mechanism, Zigbee specification protocol, Bluetooth wireless standard, and power-line communication (PLC) technology.

Yet further according to another aspect of the present invention there is provided a remote control system and/or method where the mobile device is operative to present to a user one or more service providing device associated with the second local device.

Still further according to another aspect of the present invention there is provided a remote control system and/or method additionally including a plurality of second local devices, where each of the second local devices is associated with a location, where the mobile device is operative to present to a user one or more of the locations, and where, responsive to user selection of a location, the mobile device is operative to present to the user a list of service providing devices associated with the location.

Even further according to another aspect of the present invention there is provided a remote control system and/or method including a service providing device, and a mobile device including a microphone and a speaker operative to communicate audible sound, a speech recognition module operative in the mobile device, a transmitter operative in the mobile device, and a receiver operative in the service providing device, where the mobile device is operative to use the speech recognition module to detect a user command provided using speech and to transmit to the service providing device a control command associated with the speech command, and where the transmitter and the receiver use acoustic communication at a communication range larger than one meter.

Also, according to another aspect of the present invention there is provided a method and a system of a mesh network system including a plurality of acoustic modems, where each acoustic modem includes a processor, a memory, a speaker, a microphone, and a software program stored in the memory and executed by the processor, the software program operative to use one or more of the speaker and the microphone to communicate with another acoustic modem using acoustic communication, where the acoustic modems are operative to communicate with each other over a range larger than 1 meter, where the one or more of the acoustic modems is operative to receive from one or more second acoustic modem an identification of one or more third acoustic modem within communication range of the second acoustic modem, and where the first acoustic modem is operative to communicate with the third acoustic modem via the second acoustic modem.

According to yet another aspect of the present invention there is provided a system and a method of a mesh network additionally including a service providing device, a first local control device operative to control the service providing device, a second local control device operative to communicate with the first local control device using acoustic communication, and a mobile device operative to communicate with the second local control device using acoustic communication, where the mobile device operative to control the service providing device by communicating via the first and second local control devices.

According to still another aspect of the present invention there is provided a system and a method including a first device and a second device, each including a processor, a memory, a speaker for providing sound to a user, a microphone for receiving sound from a user, an audio compression module, and/or an audio decompression module, and a software program stored in the memory and executed by the processor, where the software program is operative to use a speaker and a microphone to communicate acoustic communication, where the first device is operative to compress audio, and transmit the compressed audio using the acoustic communication, and where the second device is operative to receive the compressed audio using the acoustic communication, and decompress the communicated compressed audio.

Further according to another aspect of the present invention there is provided a system and a method for a mobile device including a microphone, a first input channel connected to the microphone and operative to receive audio signals via said microphone in the frequency range of 0-20 KHz, and a second input channel connected to said microphone and operative to receive audio signals via the same microphone in the frequency range of 14 KHz-20 KHz. The second input channel including: a filter operative to filter signals in the frequency range of 14 KHz-20 KHz, an amplifier operative to amplify signal from the filter, and an analog to digital converter. The filter, amplifier and analog to digital converter of the second input channel operate independently of the first input channel. The second input channel is operative to receive digitally coded acoustic information.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 9 is a simplified block-diagram of three display screens of a mobile device;

DETAILED DESCRIPTION OF THE INVENTION

Figure 1:
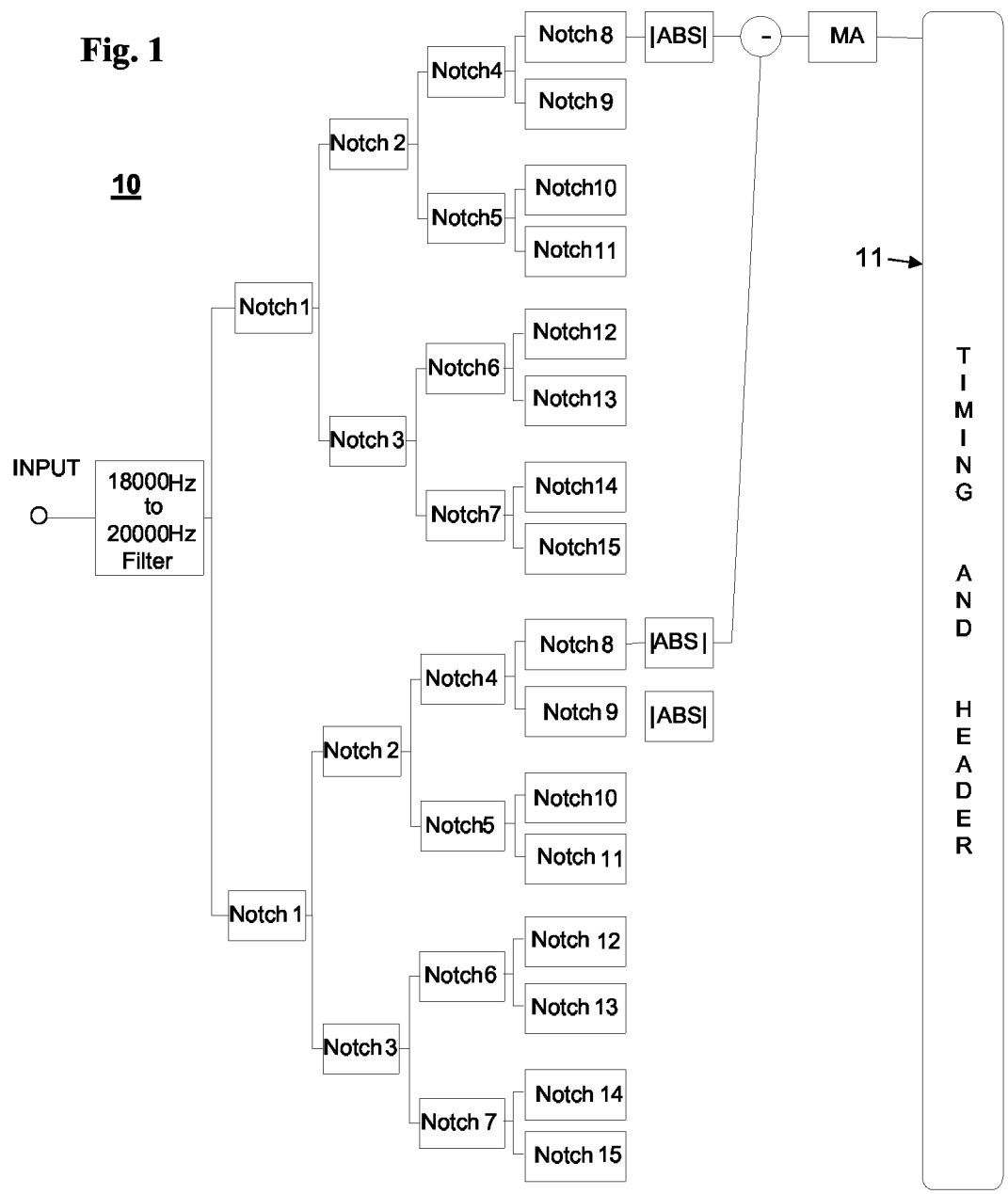
FIG. 1 is a simplified is a simplified illustration of a block diagram of an acoustic demodulator.

The principles and operation of a method and a system for using acoustic communication according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it is described.

The purpose of the system and method of using acoustic communication, is to implement a personal area network (PAN) using acoustic technology. This enables communication of packet and/or streaming data (e.g. sound, voice, etc.) within a range of 1 to 10 meters, typically indoors, but optionally also outdoors. A typical use of PAN is for remote control devices such as for operating air-conditioning systems, home entertainments systems (television units, set-top-boxes, audio systems, home theater systems, etc.), computers and video games, toys, etc., and generally in the area of home control.

Several possible methods of acoustic communication for implementation of a remote controller are now described.

Technical Information:

The "theoretical achievable" rate based on the Shanon theory, is given by:

Max_Bit_rate=2000 log$_2$(SNR+1)=
2000 log$_2$(10$^{(-8/10)}$+1)=424 BPS if the receiver is designed with 5 to 10 dB distant from the above, then:

Possible_Bit_rate=2000 log$_2$(SNR+1)=
2000 log$_2$(10$^{((-8-10)/10)}$+1)=45 BPS It is possible to use a simple microphone with a good amplifier working at the range of 18000-20000 Hz, and get an acoustic remote controller working at the rate of 30-36 BPS, at a distance of 10 meters and in between rooms Possible Modulation Methods to Implement the Remote Controller:

1. Frequency Shift Keying (FSK)

The delay spread of the Channel Impulse response (CIR) is about 0.1 sec, therefore in order to implement simple FSK, one would need to mitigate the multipath therefore symbol rate must be greater than 0.1 sec. So 0.3 sec will do the job, however, having such a low symbol rate would imply that the bit rate of one FSK channel would be 3 BPS, so in order to have 36 BPS, one would need about 12 FSK channels.

Also packet header is needed, so if there is about 12 bits every 0.3 sec, it is required to add about 8 bits for CRC and header. This would mean that it is required about 60 BPS or 20 channels of FSK modem, and that each would occupy 100 Hz bandwidth Reference is now made to FIG. 1, which is a simplified illustration of a block diagram of a demodulator 10, according to one embodiment of the present invention.

As shown in FIG. 1, demodulator 10 is an 8-channel multi-FSK demodulator. Element 11 of demodulator 10 processes time and header. It is noted that the transmitter/controller has a predefined signal sequence. The 8-channel multi-FSK demodulator is implemented as follows:

Let $\{f_{a,1}, f_{b,1}\}, \{f_{a,2}, f_{b,2}\}, \ldots, \{f_{a,20}, f_{b,20}\}$ be the 20 channels of the FSK the first above notch level:
notches out all the a's and it results with $\{f_{b,1}, f_{b,2}, \ldots, f_{b,20}\}$
the first above notch level:
notches out all the b's and it results with $\{f_{a,1}, f_{a,2}, \ldots, f_{a,20}\}$ then the second level of notch filters would now divide the results into two groups for the b and it results with $\{f_{b,1}, f_{b,3}, \ldots, f_{b,17}\}$ and $\{f_{b,2}, f_{b,4}, \ldots, f_{b,20}\}$ for the a, it results with: $\{f_{a,1}, f_{a,3}, \ldots, f_{a,17}\}$ and $\{f_{a,2}, f_{a,4}, \ldots, f_{a,20}\}$ and The above operation continues until there is for each output one frequency left, then an Absolute value is calculated for each of the frequencies and the value for the "0" is subtracted from the value of the "1" and a smoothing moving average filter is applied. This will generate a demodulated "square wave" showing the bit stream at each channel. Each bit stream would be described by at least 16 samples, hence, a timing module is needed. The timing is done using a search for the best timing. Data is received whenever, the packet header is received.

MIPS estimation for this method:

For n frequencies notch there is a need for about 2*n+1 taps. This means that there is a need to have the following amount of taps:

2X(21+2X11+4X 7+8X3)=~200 Taps, 200 Taps running at 44100 Hz plus the input filter would give about 16 MIPS for a mediocre receiver 2. Quadrature Amplitude Modulation (QAM)

It is referred to QPSK, QAM and M-QAM (known as OFDM). Basic receiver here includes pre-processing of the input signal some parameter estimation e.g. phase and gain, timing and equalization.

Figure 2:
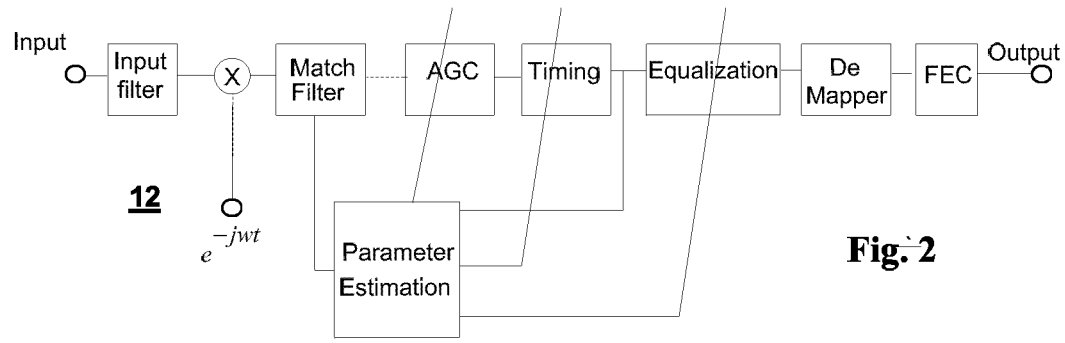
FIG. 2 is a simplified block diagram of a receiver for acoustic QAM demodulator.

Reference is now made to FIG. 2, which is a simplified block diagram of a receiver for QAM demodulator 12, in accordance with one embodiment of the present invention.

Regarding the QAM demodulator receiver 12 of FIG. 2, this kind of receiver, (or an OFDM receiver) could not work with SNR's as low as −5−−8 dB. This is due to the fact that Equalization estimation (QAM & OFDM) could not give good results with low SNR's.

Parameter estimation (phase, gain timing etc.) could not work with low SNR's.

The length of the equalizer should be at least 0.3 sec. This means that one would need at 10000 Hz (4 times the symbol rate) to have 3000 Taps for the equalizer. With 5 cycles per tap, this would mean 5000×3000×5=75 MIPS 3. Pulse Position Modulation This method uses the location of pulses to transmit the information, usually a differential method.

Figure 3:
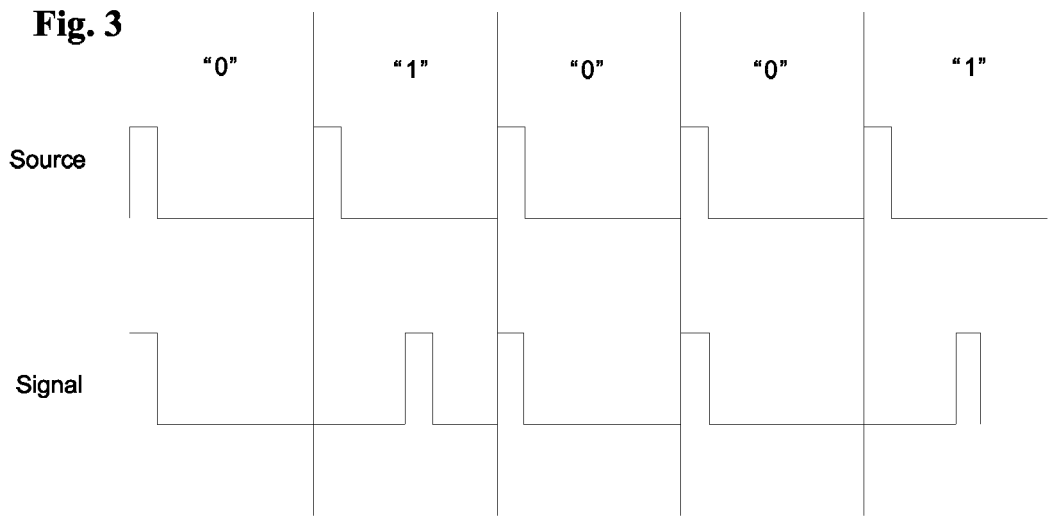
FIG. 3 is a simplified chart describing a modulated acoustic PPM signal.

Reference is now made to FIG. 3, which is a simplified chart describing a modulated PPM signal, according to one embodiment of the present invention.

This method is not suitable for highly dispersive channels

4. Direct Sequence—Spread Spectrum (DS-SS)

This method provides transmission of a random +/−1 signal with length of N. This method is a very robust method for a multipath channel, and can use the multipaths to improve reception.

Figure 4:
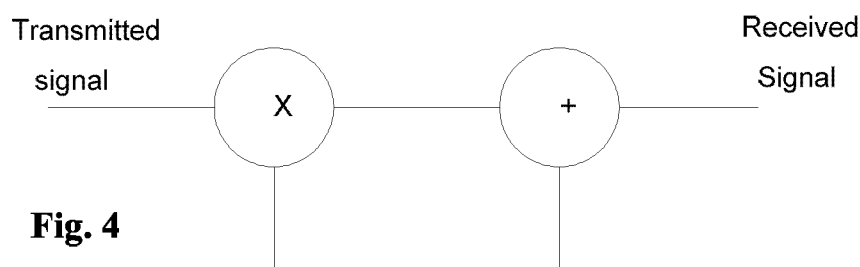
FIG. 4 is a simplified block diagram of a DS-SS AWGN acoustic channel.

A tutorial explanation for the benefits of this method:

Reference is now made to FIG. 4, which is a simplified block diagram of a DS-SS AWGN channel, as provided and employed in accordance with one embodiment of the present invention.

Let: $\{b_0, b_1, \ldots b_{N-1}\}$ where b could +1 or −1 be the transmitted signal Let the transmitted signal pass through the channel of FIG. 4.

Figure 5:
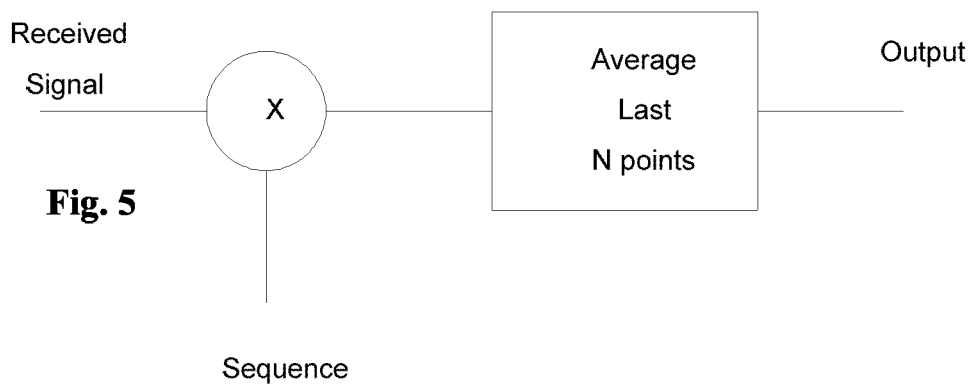
FIG. 5 is a simplified block diagram of a sequence detector.

The received signal is described by y[n]=ax[n]+v[n]
where:
x is the transmitted signal
a is the channel attenuation
v is the AWGN noise Reference is now made to FIG. 5, which is a simplified block diagram of a sequence detector, according to one embodiment of the present invention.

The receiver for the transmitted sequence is described with reference to FIG. 5 as follows:

Out of correlation there is:

$$\text{out} = \frac{1}{N}\sum_{k=0}^{N-1} b_k v_{n-k} \pm \frac{a}{N}$$

In correlation there is $$\text{out} = \frac{1}{N}\sum_{k=0}^{N-1} b_k v_{n-k} + a$$

The above means that for
Out of correlation there is $$E\{\text{out}\} \approx 0$$

$$E\{\text{out}^2\} = \frac{\sigma_v^2}{N}$$

In correlation there is $$E\{\text{out}\} \approx a1$$

$$\text{Var}\{\text{out}\} = \frac{\sigma_v^2}{N}, E\{\text{out}^2\} = \frac{\sigma_v^2}{N} + a^2$$

Figure 6:
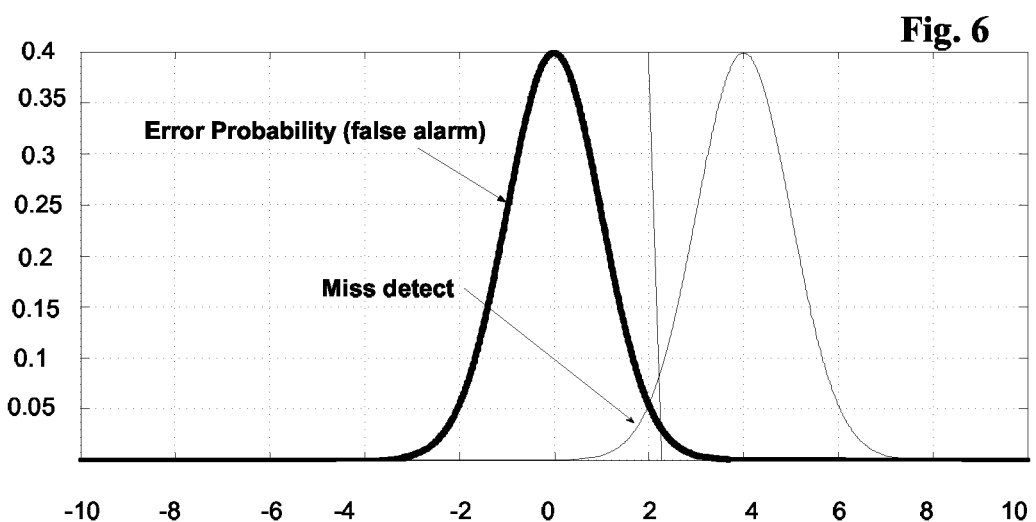
FIG. 6 is a graph describing a hypothesis selection.

This means that the following two hypothesis exist, as shown through reference to FIG. 6, which is a graph describing Hypothesis selection, according to one embodiment of the present invention.

Reference is now made to FIG. 6, which is a graph describing a hypothesis selection, according to one embodiment of the present invention.

As seen in FIG. 6, a threshold of a/2 would be a good choice for the same miss detect and false alarm probabilities.
The SNR is $$SNR = \frac{a^2}{\sigma^2}$$

this means that the width of the Gaussian above is given by:

$$\frac{\sigma_v^2}{N} = \frac{a^2}{N \cdot SNR}$$

For a given SNR, increasing N would enable working with extremely low SNR's

Figure 7:
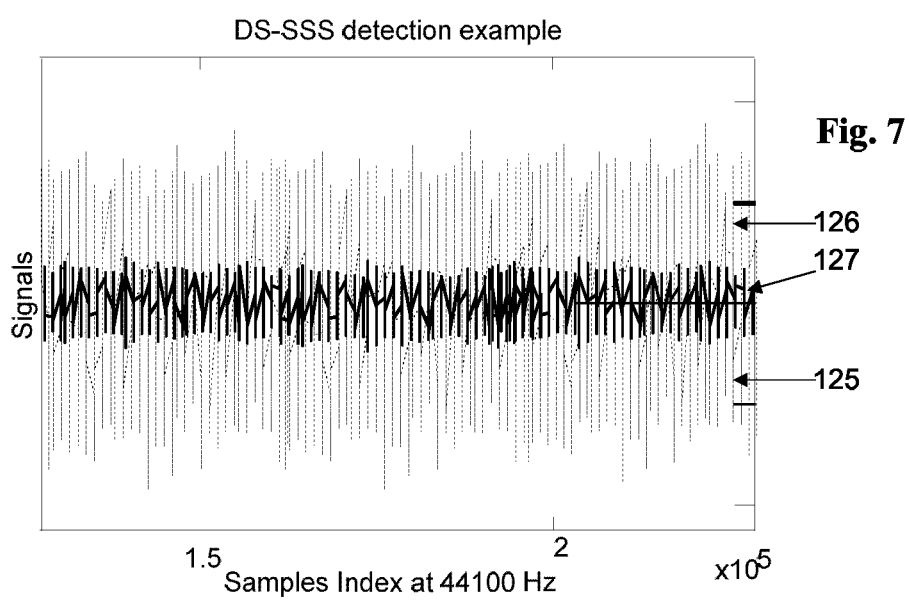
FIG. 7 is a graph showing an example of a DS-SS detection.

Reference is now made to FIG. 7, which is a graph showing an example of a DS-SS detection, according to one embodiment of the present invention.

In FIG. 7, the signal is presented as a bold line designated by numeral 13, and the noise is presented as a light line designated by numeral 14. Signal 13 is the sequence, and while it is immersed in noise 14, it be detected with probability of false or miss as low as 1 e-6.

Figure 8:
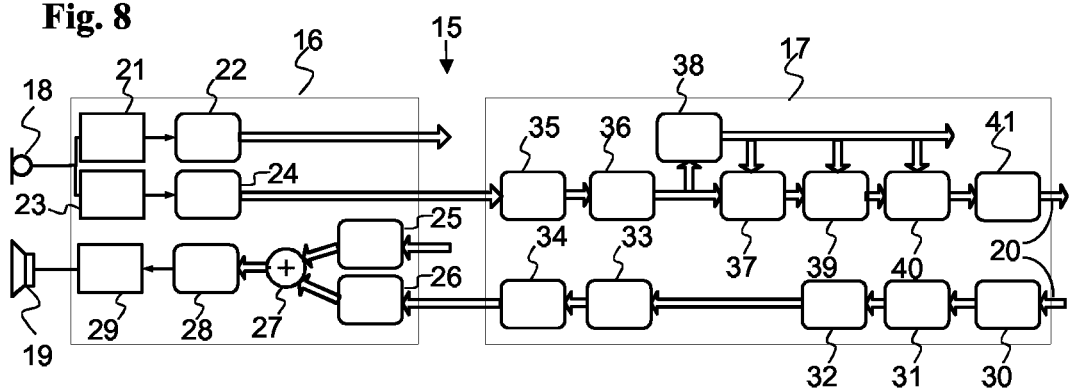
FIG. 8 is a block diagram of an acoustic modem.

Reference is now made to FIG. 8, which is a block diagram of an acoustic modem 15, according to one embodiment of the present invention.

As seen in FIG. 8, acoustic modem 15 includes two main parts: analog front-end module 16 and base-band processing module 17 communicatively coupled. The analog front end module 16 also connects to a microphone 18 and a speaker 19. It is appreciated that analog front end module 16 may operate more than one microphone 18 and/or a speaker 19. The base-band processing module 17 connects via communication links 20 to a higher level processing facility such as an application processor (not shown).

The analog front end module 16 typically includes an input circuitry connected to microphone 18 and an output circuitry connected to speaker 19. The input circuitry includes two channels, a sound oriented first input channel and a modem oriented second input channel. The first input channel includes a low band amplifier and filter 21 and an analog-to-digital (ADC) converter 22 connected to the input of an analog audio circuitry of the host device (e.g. a mobile device, a TV set, etc.)

The low pass amplifier and filter 21 typically carries uncoded (analog) sound, music, speech, etc. For example in the frequency band of 0 to 14 KHz. It is appreciated that the 14 KHz limit is arbitrary and can be 15 KHz, 18 KHz or any other frequency lower than 20 KHz. The second input channel is intended to carry coded modem data and includes a band pass amplifier and filter 23 and an analog-to-digital (ADC) converter 24. In this example, band pass amplifier and filter 23 communicates the frequency band of 14 KHz to 20 KHz.

It is appreciated that it is advantageous to embed this dual channel system in any device implementing acoustic communication, including mobile devices such as smartphones, and tablets, and service providing devices such as television (TV) and audio systems.

The output circuitry of analog front end module 16 includes a sound oriented first output channel 25 and a modem oriented second output channel 26, typically corresponding to the first and second input channels. The first output channel 25 is typically a low pass filter in the frequency band of 0 to 14 KHz, and the second output channel 26 is typically a band pass filter for the frequency band of 14 KHz to 20 KHz. The signals passing through the first and second output channels are combined at 27, and fed via digital-to-analog converter (DAC) 28 and output amplifier filter 29 (typically 0 to 20 KHz) to speaker 19. The first output channel is typically connected to the output of an analog audio circuitry of the host device (e.g. a mobile device, a TV set, etc.)

Base-band processing module 17 includes a modulator channel and a demodulator channel. The modulator channel receives data from a higher level processing facility such as an application processor into data link layer 30, connected to a forward error correction (FEC) module 31, which is connected to a data-symbols pre-processing and mapping module 32, which is connected to a fast-Fourier-transform (FFT) module 33, which is connected to a front-end Digital signal processor (DSP) transmitter 34, which connects to the output channel of the analog front end module 16.

The demodulator channel receives coded audio signal from the second input channel of analog front end module 16. The coded audio signal is received into a front-end Digital signal processor (DSP) receiver 35, connected to a fast-Fourier-transform (FFT) module 36, which is connected to a data symbols extractor module 37 and to a noise Doppler dispersion channel estimator 38.

Data symbols extractor module 37 connects to a data symbols estimator 39, which connects to a forward error correction module 40, which connects to a data link layer module, 41, connecting to a host application processor or a similar processing facility.

Noise Doppler dispersion channel estimator 38 connects to the data symbols extractor module 37, to data symbols estimator 39, and to forward error correction module 40.

Acoustic modem 15 shown in FIG. 8 may be embedded in smart phone or a tablet. The analog front-end of the smart phone tablet provides a good quality acoustic modem on the receiver side (higher analog to digital conversion dynamic range—with mitigation of interference from audio voice and music signals) and maximum volume on the transmitter side. The operation of acoustic modem 15 is not affected by the local volume control of the smart phone or tablet, which controls only the audio voice and music volume.

The signal on the receiver side is first processed by a front-end processing such as mixing, re-sampling, shaping, etc., to prepare the received signal for signal processing algorithm. Next the signal is converted to the frequency domain, in which the noise, dispersion, Doppler and channel are estimated. Using these data parameters the coherent modem can extract the data symbols and run a FEC (Forward Error Correction) and pass the signal to a link layer.

On the transmitter side, data bits are first passed through a FEC and then these bits are mapped in a certain way to allow reception in extremely fast changing dispersive noisy channel. The symbols are later converted to a time domain and the signal is pre-processed by the front end processing transmitter side. The output of the front end DSP processing is mixed with audio voice or music. There is no interference since acoustic modem and audio voice/music are in different bands.

Mobile telephones, computers and other devices having microphones and speakers can transmit and receive audio signals in the frequency band of 0-20,000 Hz. However, in most cases, only 0-8,000 Hz is used. The audio spectrum above 14000 Hz is rarely used and have low acoustic noise. Furthermore, humans can usually hear up until 14,000 Hz, which makes the region of 14,000 Hz-20,000 Hz useful for acoustic communication. A common microphone would have a noise density of about 10-18 nv/sqrt(Hz). The noise floor in the band of the acoustic communication is therefore:

$$V_n = 10 \text{ nv}\sqrt{6000} = 0.77 \cdot 0.10^{-6} v = 0.77 \mu v \quad \text{Eq. (1)}$$

Audio signal received by a microphone from music and voice in the band of 0-8000 Hz would generate about 1 mv-5 mv. Assuming an amplifier having gain of 1000, the signal amplitude at the output of an amplifier is approximately 1 vptp for the 0-8000 Hz. Using 16 bits analog to digital converter a 1 bits step is:

$$1 \text{Bit)Step} = \frac{1}{2^{16}} = 15.2 \ \mu v \quad \text{Eq. (2)}$$

Therefore, the acoustic communication signal should provide at least 15.2 uv per bit, and 5 bits resolution requires a signal of 32*15 uv=480 uv As seen in FIG. 8, the input circuitry is divided into a sound input channel and a communication input channel, each with its own filter-amplifier (21 and 23) and ADC (22 and 24). The communication input channel (filter-amplifier 23 and ADC 24) operating in the 14000-20000 Hz frequency band.

Therefore, the communication input channel has good resolution even for very low signals of just 1.4 uv (SNR=6 dB). Amplifier gain of 1000 provides a signal of 14 mv and a 16 bits ADC provides 9.8 bits resolution. This requires only 1.4 uV to accommodate signal-to-noise ratio (SNR) of 6 dB, compared with 30 uV without the additional communication channel, providing improvement of 26 dB.

Reference is now made to FIG. 9, which is a simplified block-diagram of three display screens of a mobile device, according to one embodiment of the present invention.

FIG. 9 shows a mobile-device 42, such as a mobile telephone, a smartphone, a tablet, etc., functioning as a controller. typically provides the user with a list of categories of home appliance including: TV sets, stereo systems, air-condition systems, electric blinds and the like. The categories are typically shown to the user on a touch-screen, allowing the user to select the category of appliances to be added to the controller system, for example, TV sets. The mobile device then typically connects to the Internet, and presents to the user a list of firms, from which the user selects the firm of the appliance in question, such as Sony in the present example.

Turning to FIG. 9 it is seen that, having selected to add a Sony TV, the user is now presented with screen 43 displayed by mobile phone 42. As shown in FIG. 9, Screen 43 includes a list of models of Sony TV sets, which the mobile device typically downloads from the Internet. Having selected the required model form the list, the user is presented with screen 44 with "select" and "cancel" buttons for the model in question. As further seen in FIG. 9, once the user has pushed the "select" button, the mobile phone 42 communicates with a suitable server 45. Mobile phone 42 typically communicates with server 45 over a communication network 46 such as the Internet. Mobile phone 42 downloads (screen 47) from server 45 a list of control codes, such as used by a universal controller for controlling the appropriate TV model. Namely a list which includes all the IR codes for the TV set, detailing which code is required for activating each function on the TV set.

Figure 10:
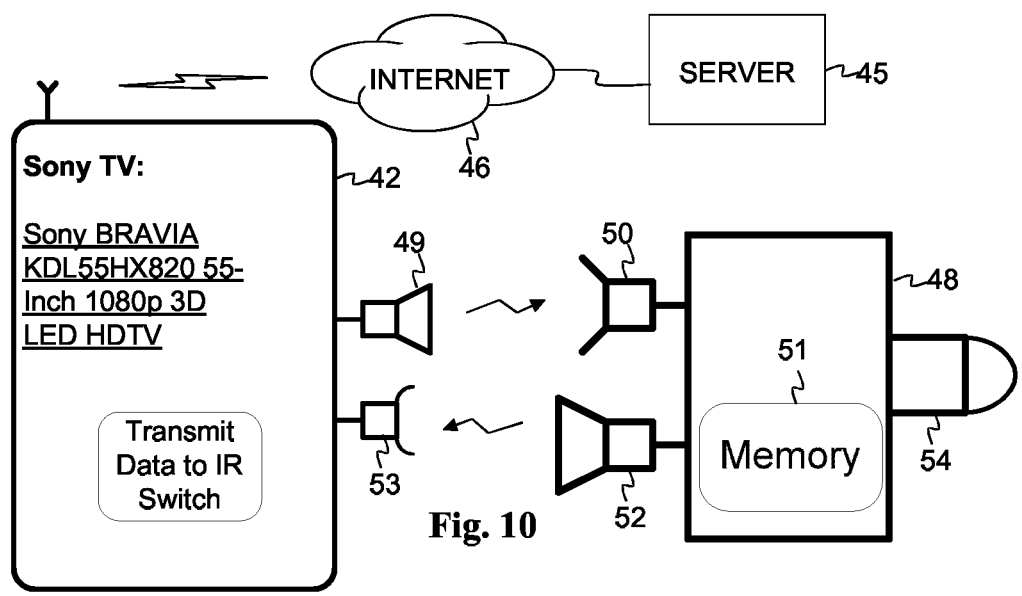
FIG. 10 is a simplified illustration of a mobile device communicating with an IR switch.

Reference is now made to FIG. 10, which is a simplified illustration of a mobile device 42 communicating with an IR switch 48, according to one embodiment of the present invention.

Turning to FIG. 10 it is seen that mobile device 42 communicates wirelessly, via a communication network 46 such as the Internet, with an Internet server 45, which provides IR codes for controlling a selected TV set. Having downloaded the IR codes with their corresponding command numbers, mobile device 42 transfers the codes to IR switch 48, typically via acoustic communication with IR switch 48. IR codes are transmitted by mobile device 42 via speaker 49 and received by IR switch 48 via microphone 50. A new device category is then opened in a memory unit 51 on IR switch 48, storing all command numbers with their corresponding IR codes for the TV set.

A feedback announcement is then transmitted by IR switch 48 via speaker 52 and received by mobile device 42 via microphone 53. Mobile device 42 then shows the user an announcement, informing the user that the TV set has been successfully added to the controller system. From that moment on, any command number signaled by the user by means of mobile device 42, is acoustically received by IR switch 48 which is now operative to find the corresponding IR code in its memory unit and transmit the IR code to the TV set in question, via IR transmitter 8 on IR switch 48.

IR switch 48 has a power connection or runs on batteries. IR switch 48 is typically placed in a such a way that IR transmitter 54 is directed at the IR receptor of the TV set. Alternately, IR switch 48 is capable of transmitting IR signal which do not require a direct line-of-sight, such as defused IR. In that case, IR switch 48 is placed at a suitable location, and is operative to transmit IR signal to any device in the same room.

It is appreciated that the embodiment of FIG. 10 is suitable for cases wherein the IR codes are rather long. In other cases, it is possible to employ a system wherein mobile device 42 does not transmit a command number but an acoustic signal which includes an entire IR code, and IR switch 48 is operative to convert the signal to its corresponding IR code, to be transmitted to the TV set. In this alternative configuration, IR switch 48 does not require a memory unit for an entire code list, but only a small memory for the IR code for "1" and "0", allowing IR switch 48 to produce an IR code in real time for any bit sequence received from mobile device 42.

Figure 11:
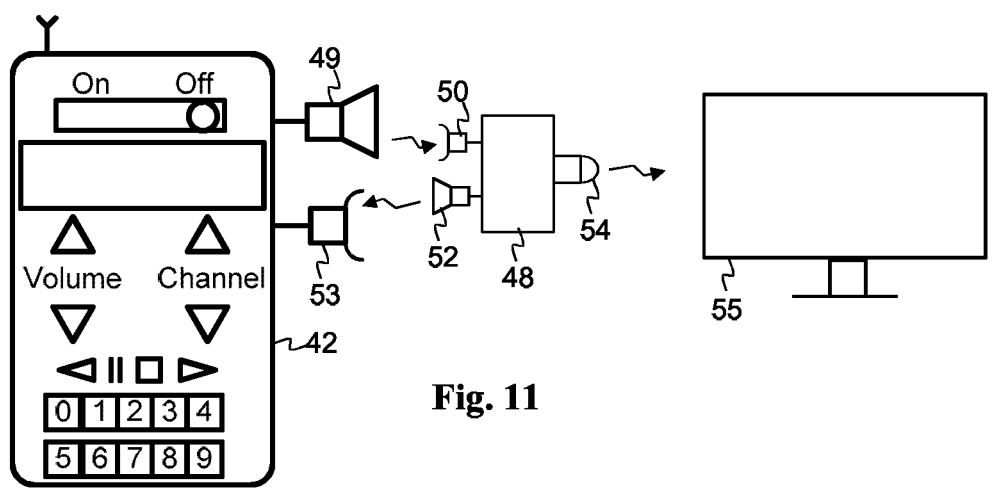
FIG. 11 is a simplified block-diagram of a mobile device communicating with a TV set via an IR switch.

Reference is now made to FIG. 11, which is a simplified block-diagram of mobile device 42 communicating with a TV set 55 via IR switch 48, according to one embodiment of the present invention.

Turning to FIG. 11, it is seen that a mobile device 42, which includes an antenna providing Internet connection, presents to the user a TV controller screen including: On/Off buttons, channel buttons, and volume Up/Down buttons, as well as box showing what command has been activated. Mobile device 42 communicates acoustically with an IR switch 48, via speaker 49 and microphone 53 on mobile device 42 and speaker 52 and microphone 50 on IR switch 48. In the present example, an acoustic signal including an appliance number and an IR code number is transmitted by mobile device 42 via speaker 49, which signal is received by IR switch 48 via microphone 50. Having received the appliance and IR code numbers, IR switch 48 retrieves from its memory the corresponding IR code for the appliance—a TV set 55—and transmit the IR code to the appliance via an IR transmitter 54.

Alternately, an acoustic signal including an IR code bit sequence is transmitted by mobile device 42 and received by IR switch 48, which bit signal is directly transmitted as an IR code to TV set 55 via IR transmitter 54.

Figure 12:
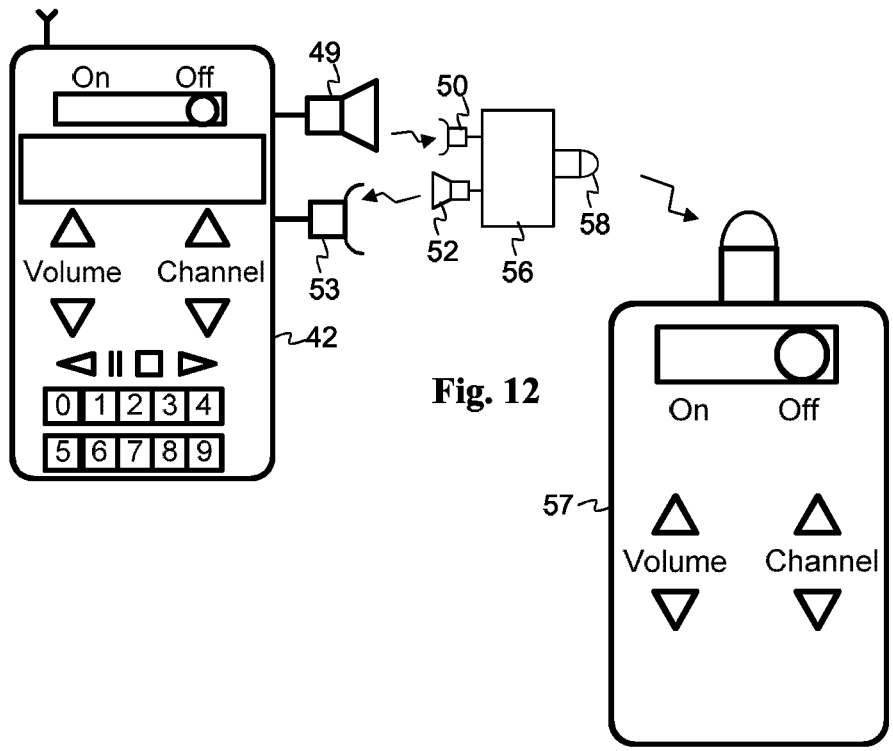
FIG. 12 is a simplified illustration of mobile device communicating with an IR switch, and a remote controller.

Reference is now made to FIG. 12, which is a simplified illustration of mobile device 42, IR switch 56, and a remote controller 57, according to one embodiment of the present invention.

Turning to FIG. 12, it is seen that a mobile device 42, equipped with a wireless Internet connection, presents a TV controller screen to the user including: On/Of buttons, volume Up/Down and channel Up/Down buttons. Mobile device 42 communicates acoustically with an IR switch 56, via speaker 49 and microphone 53 on mobile device 42 and speaker 52 and microphone 50 on IR switch 56. IR switch 56 is equipped with IR transceiver 58, which is capable of transmitting and receiving IR signals.

In the present example, the user has selected the now flashing volume Up button, in order to load a controller system with the IR code for the volume Up command. The selection is acoustically signaled by mobile device 42 to IR switch 56. At the same time, the user transmits an IR code for the volume Up command, by means of a remote controller 57, which is typically supplied together with an appliance in question, such as a TV set. The IR code from remote controller 57 is received by IR switch 56 via transceiver 58, and stored in a memory unit on IR switch 56. At the same time, IR switch 56 acoustically communicates the IR code to mobile device 42, which is operative in turn to upload the code to an Internet server with which it wirelessly communicates. In the same way, the controller system of FIG. 12 can be loaded with all the required IR codes for the control commands of the TV set in question, so that an entire IR code library can be created for the appliance and uploaded to the Internet server.

It is appreciated that the system of FIG. 12 is particularly appropriate for cases where an IR code library for a given home appliance is not available for download from the Internet. It is also appreciated that this system is particularly advantageous, in that it allows to upload the IR code library to the Internet and make it available for future download by the same as well as other users of the appliance in question. For example, is a user has two TV sets of the same model in two separate rooms, the learning process for the IR codes needs to be performed only once.

Figure 13:
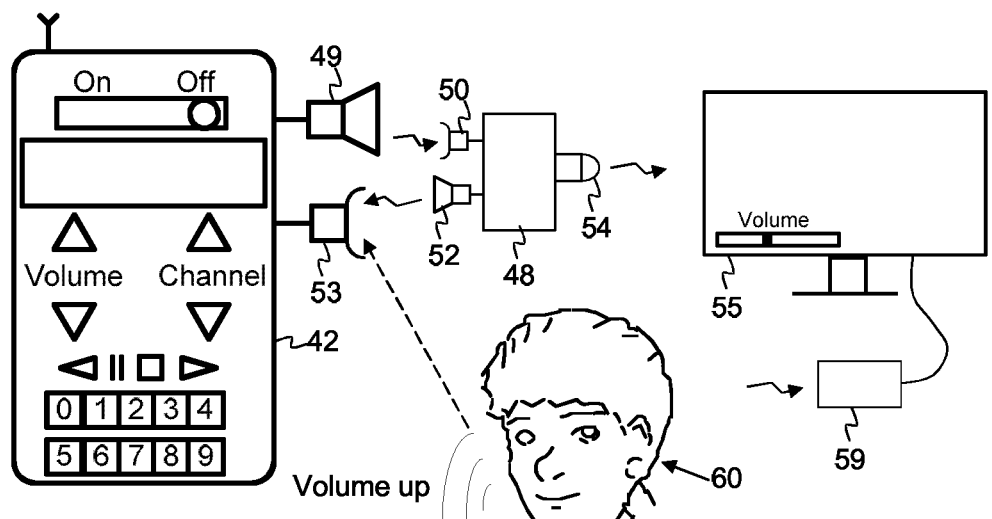
FIG. 13 is a simplified illustration of a mobile device communicating with an IR switch, a TV set and a DVD recorder.

Reference is now made to FIG. 13, which is a simplified illustration of a mobile device 42, IR switch 48 (or IR switch 56), TV set 55 and a DVD recorder 59, according to one embodiment of the present invention.

Turning to FIG. 13, it is seen that a mobile device 42, equipped with a wireless Internet connection and speech-recognition capability, presents a TV controller screen to the user including: On/Of buttons, volume Up/Down and channel Up/Down buttons. A speech-recognition capability for mobile phones is provided, for example by Apple's Siri. Mobile device 42 communicates acoustically with an IR switch 48, via speaker 49 and microphone 53 on mobile device 42 and speaker 52 and microphone 50 on IR switch 48.

In the present example, a user 60 has given a speech command for "volume Up", which is received by mobile device 42 via microphone 53. Mobile device 42 retrieves from its memory unit the command number for "volume Up", and acoustically communicates the number to IR switch 48. IR switch 48 in turn retrieves from its own memory unit the corresponding IR code and transmits it to a TV set 55 via an IR transmitter 54 (Or, if IR switch 56 is used, via transceiver 58). It is noted that microphone 53 is used by mobile device 42 to receive acoustic communication from IR switch 48 (or 56) and to receive speech commands from user. 60. It is appreciated that mobile device 42 may use microphone 53 to receive acoustic communication from IR switch 48 (or 56) and to receive speech commands from user. 60 simultaneously, at the same time.

Aside from providing ease of use, speech-recognition capability also allows the reception of more elaborate, natural language commands, which cannot be received through preset buttons on the mobile device's touch-screen. As also seen in FIG. 13, mobile device 42 receives a speech command "Record Sex and the City" by the user. Mobile device 42 then retrieves from the Internet the channel, date and time of the next episode of the TV series in question, and acoustically communicates a suitable command to IR switch 48. The command directs IR switch 48 to transmits an IR signal to DVD recorder 59, setting DVD recorder 59 to schedule a recording in accordance with the channel, date and time.

Figure 14:
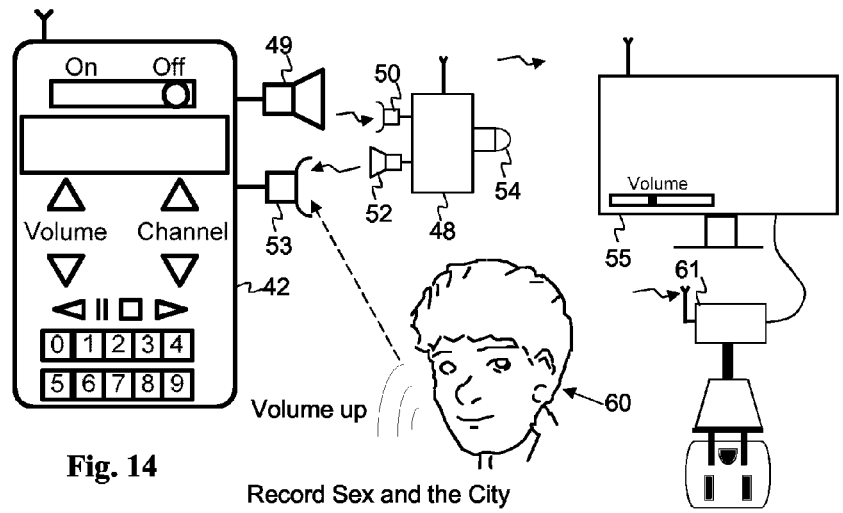
FIG. 14 is a simplified illustration mobile device communicating with an IR switch, a TV set, and a power line communication RF unit.

Reference is now made to FIG. 14, which is a simplified illustration mobile device 42, IR switch 48 (or IR switch 56), TV set 55 and a power line communication RF unit 61, according to one embodiment of the present invention.

Turning to FIG. 14, it is seen that a mobile device 42, equipped with speech-recognition capability, presents a TV controller screen to the user including: On/Of buttons, volume Up/Down and channel Up/Down buttons. A speech-recognition capability for mobile phones is provided, for example by Apple's Siri. Mobile device 42 communicates acoustically with an IR switch 48, via speaker 49 and microphone 53 on mobile device 42 and speaker 52 and microphone 50 on IR switch 48.

In the present example, user 60 has given a speech command for "volume Up", which is received by mobile device 42 via microphone 53. Mobile device 42 retrieves from its memory unit the command number for "volume Up", and acoustically communicates the number to RF switch 48. RF switch 48 in turn retrieves from its own memory unit the corresponding RF code and transmits it to a TV set 55, with which it communicates wirelessly.

Wireless communication between RF switch 48 and a home appliance such TV set 55 is typically established via Wi-Fi wireless mechanism, Zigbee specification protocol, Bluetooth wireless standard and/or any suitable wireless communication method. Alternately or in addition, power-line "data-over-power" communication is employed, using a power-line RF unit 61, which communicates with RF switch 48, employing, for example, one of the above-mentioned wireless communication method. A single power-line RF unit can then be employed for controlling all appliance in the house via power-line communication (PLC).

It is appreciated that mobile device 1 can also communicate with the RF switch 48 via Wi-Fi, Bluetooth, Zigbee, or any other suitable wireless communication method.

Figure 15:
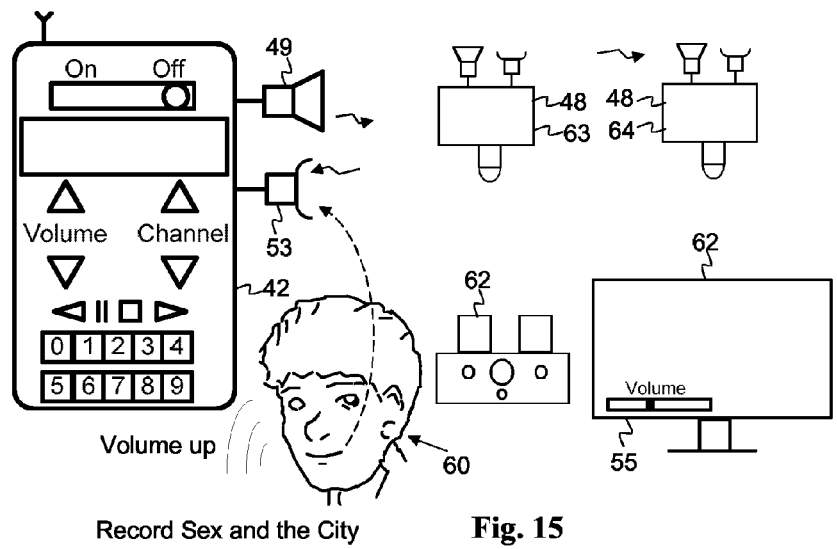
FIG. 15 is a simplified illustration mobile device communicating with a plurality of IR switches, and a plurality of home appliances.

Reference is now made to FIG. 15, which is a simplified illustration mobile device 42, a plurality of IR switches 48 (or IR switches 56), and a plurality of home appliances 62, according to one embodiment of the present invention.

Turning to FIG. 15, it is seen that a mobile device 42, equipped with speech-recognition capability, presents a TV controller screen to the user including: On/Of buttons, volume Up/Down and channel Up/Down buttons. A speech-recognition capability for mobile phones is provided, for example by Apple's Siri.

Mobile device 42 communicates acoustically with IR switch 48 designated by numeral 63, which in turn communicates acoustically with another IR switch 48 designated by numeral 64. Acoustic communication between mobile device 42 and IR switch 63, as well as between the two IR switches 63 and 64, is established via speakers and microphones on the devices as described above with reference to FIG. 1-14. Alternately or in addition, IR switches 63 and 64 may communicate with one another wirelessly via Wi-Fi wireless mechanism, Zigbee specification protocol, Bluetooth wireless standard and/or any suitable wireless communication method.

In the present example, the user has given a speech command for "volume Up", which is received by mobile device 42 via a microphone on mobile device 42. Mobile device 42 retrieves from its memory unit the command number for "volume Up", as well as the device number for the command in question, and communicates it acoustically to IR switch 63 together with a device number, referring to TV set 55 in the present example. Based on the device number, IR switch 63 communicates the command number to IR switch 64, which in turn retrieves from its memory unit the corresponding IR code and transmits it to TV set 55 via an IR transmitter on IR switch 64.

It is appreciated that the system of FIG. 15 allows a plurality of IR switches 48 (and/or IR switches 56) to serve as repeaters, thereby to carry an acoustic message by a mobile device to any appliance around the house.

Figure 16:
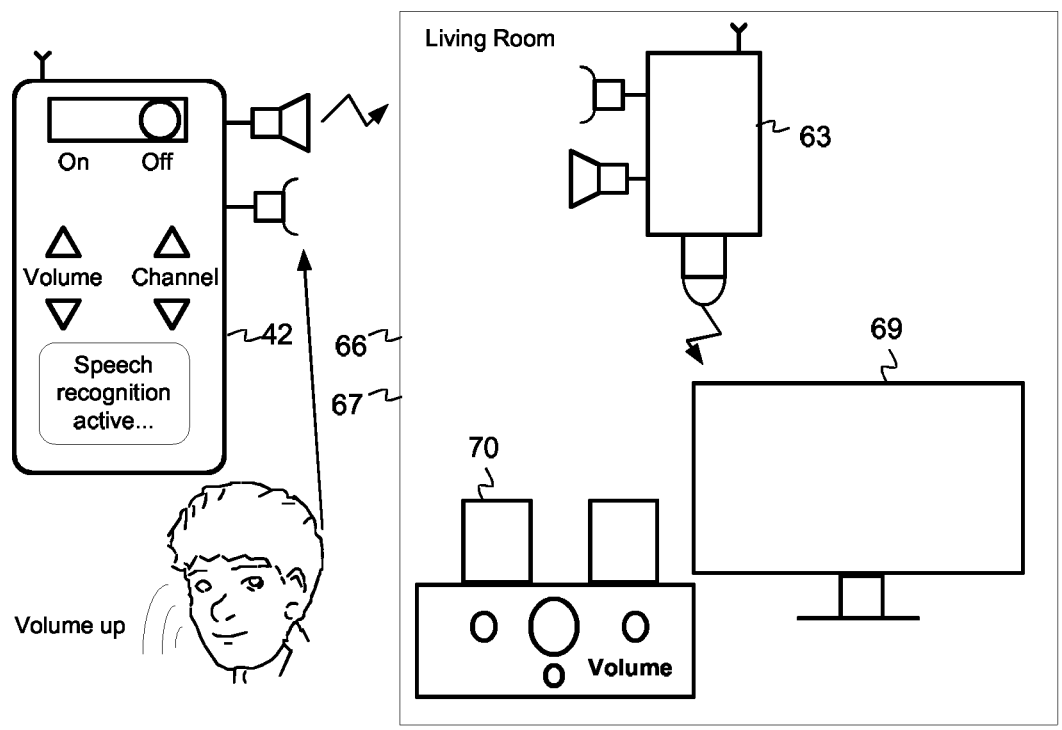
FIG. 16 is a simplified illustration mobile device communicating with a plurality of IR switches and a plurality of home appliances distributed in secluded areas.
Figure 16:
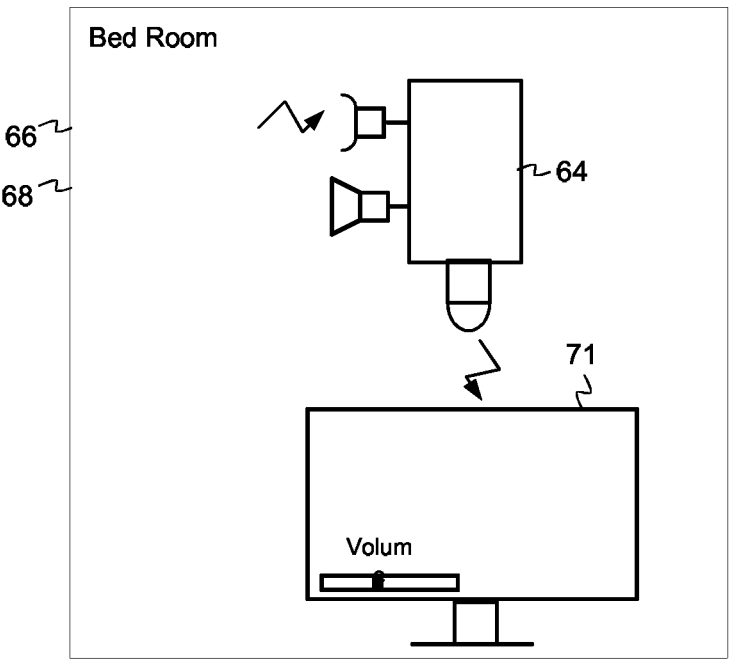

Reference is now made to FIG. 16, which is a simplified illustration mobile device 42, a plurality of IR switches 48 (or IR switches 56), and a plurality of home appliances 65 distributed in secluded areas 66, according to one embodiment of the present invention.

Turning to FIG. 16, it is seen that mobile device 42 equipped with speech-recognition capability presents a TV controller screen to the user including: On/Of buttons, volume Up/Down and channel Up/Down buttons. A speech-recognition capability for mobile phones is provided, for example by Apple's Siri.

While present in a particular room in the house (e.g. a first secluded area 66 designated by numeral 67), mobile device 42 is operative to communicate acoustically with IR switch 63, which is located in the same room. In the present example, IR switch 63 placed at a living room (67) and IR switch 64 is placed at a bed room e.g. a second secluded area 66 designated by numeral 68). Acoustic communication between the mobile device and IR switches 63 and 64 is established via speakers and microphones on the devices as described above with reference to FIG. 1-15.

Mobile device 42 is also equipped with room detection capability, allowing mobile device 42 to determine the room in which it is present. Room detection capability employs, for example, object identification based on one or more pictures of the room's interior which are received via the mobile device's camera. Alternately or in addition, an IR switches distributed in the rooms (secluded areas 66) continually communicate their IDs via acoustic beacon signals. An acoustic beacon signal of a particular IR switch is received by mobile device 42 only if it is located in the same room with the IR switch. Based on an IR switch ID, the mobile device can determine the room in accordance with a previously stored home arrangement, which the user has entered via a suitable interface, as described below with reference to FIG. 17. Alternately or in addition, a GPS chip on the mobile device allow room detection.

Based on the detection of a room, mobile device 42 retrieves from its memory unit a room configuration which describes the relationship between appliances in the room in question. In the present example, in the living room 67, the sound for TV set 69 is provided via a stereo surround system 70, whereas in the bedroom 68, TV set 71 employs its own sound system. Accordingly, while in the living room 67, the voice command "volume up" causes the mobile device to communicate a command number to IR switch 63, thereby to cause IR switch 63 to transmit a "volume up" IR code to the stereo surround system 70. Whereas while in the bedroom 68, the same voice command "volume up" causes the mobile device 42 to communicate a command number to IR switch 64, thereby to cause IR switch 64 to transmit a "volume up" IR code to TV set 71.

Figure 17:
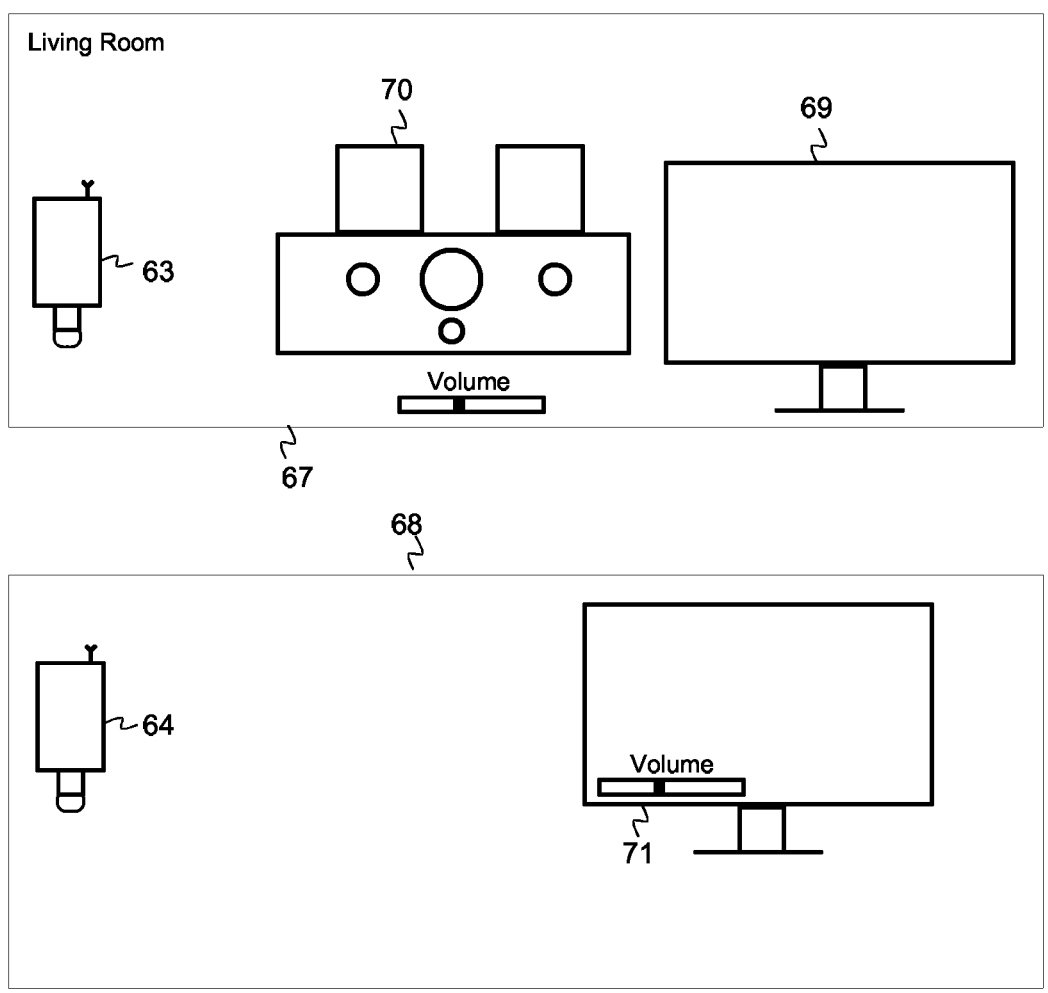
FIG. 17 is a simplified illustration of an interface screen display.

Reference is now made to FIG. 17, which is a simplified illustration of an interface screen display, according to one embodiment of the present invention.

Turning to FIG. 17, it is seen that a "My Home" interface screen displays multiple rooms, a living room and a bedroom in the present example, showing the appliances and the IR switches in each room. Via this interface, which is available on the Internet and/or on a mobile device, a user may determine which appliances are to be controlled in each room, and also the control functions associated with each appliance. The user may also determine which IR switch is located in each room.

In the present example the sound for TV set 69 in the living room 67 is provided via audio surround system 70 (rather than TV set 69 own speakers). In the bedroom 68 the sound for TV set 71 is provided by the TV set 71 speakers. Additionally, IR switch 63 is assigned to the living room 67, and IR switch 64 is assigned to the bedroom 68

Based on the home arrangement as provided via this interface, the mobile device determines which appliance is to perform a given command by the user in each room. The mobile device is operative to detect the room wherein it is present, for example, via acoustic beacon signals by the IR switch inside the particular room, which signals carry the IR switch ID. Thus in the present example, receiving a beacon signal from IR switch 63, allows the mobile device to determine that it is located in the living room 67. In response to a "volume up" command by the user, the mobile device will therefore transmit a command code to IR switch 63, thereby IR switch 63 transmits a "volume up" IR code to the stereo surround system 70. In the bedroom 68, the same voice command "volume up" causes the mobile device to communicate a command number to IR switch 64, thereby IR switch 48 transmits a "volume up" IR code to TV set 71.

As disclosed above with reference to FIGS. 15, 16, and 17, a plurality of local devices such as IR switches 48 may form a network of local devices, or IR switches 48 (or IR switches 56). The network enables the IR switches 48 to communicate data between themselves. The plurality of local devices, or IR switches 48, is typically arranged in form of a mesh network, enabling any local device, or IR switch 48 to communicate with any other local device, or IR switch 48 within its range. The mesh network also enables any local device, or IR switch 48, to use a second local device, or IR switch 48, as a relay, enabling the first local devices, or IR switches 48 to communicate data to a third local device, or IR switch 48, via the second local device, or IR switch 48.

As disclosed herein, the communication within the mesh network may use any appropriate communication technology, or a combination of communication technologies. Any pair of local devices, or IR switches 48 within the mesh network may use acoustic communication, for example for communicating within a large room, a corridor, a staircase, etc., and PLC or wireless communication to communicate between rooms or across walls, or larger distances.

It is appreciated that the mesh network enables a plurality of mobile devices 42 to remotely control a plurality of service providing devices such as TV sets 55 by relaying communication via the plurality of local devices, or IR switches 48.

Figure 18:
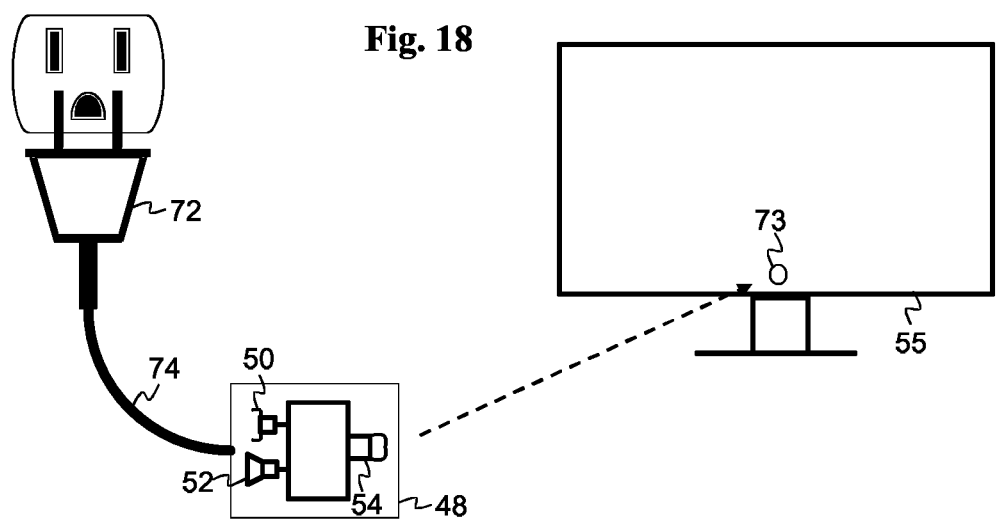
FIG. 18 is a simplified illustration of an IR switch, a power connection, and a TV set.

Reference is now made to FIG. 18, which is a simplified illustration of an IR switch 48, a power connection 72, and a TV set 55, according to one embodiment of the present invention.

Turning to FIG. 18 it is seen that an IR switch 48 has a power connection 72. IR switch 48 is operative to communicate acoustically, typically with a mobile device (not shown), via microphone 50 and speaker 52. IR switch 48 is also operative to transmit IR code via IR transmitter 54, thereby to control a TV set 55, which receives the IR code via IR receiver 73. IR switch 48 is typically placed in front of TV set 55, to provide a direct line of sight that allows an IR transmission from transmitter 54 to receiver 73. Alternately, a power cable 74 is operative to be bent, thereby to allow IR switch 48 to be connected to a power socket on a wall, for example behind TV set 55, and then turned towards receiver 73 on the TV set 55.

Figure 19:
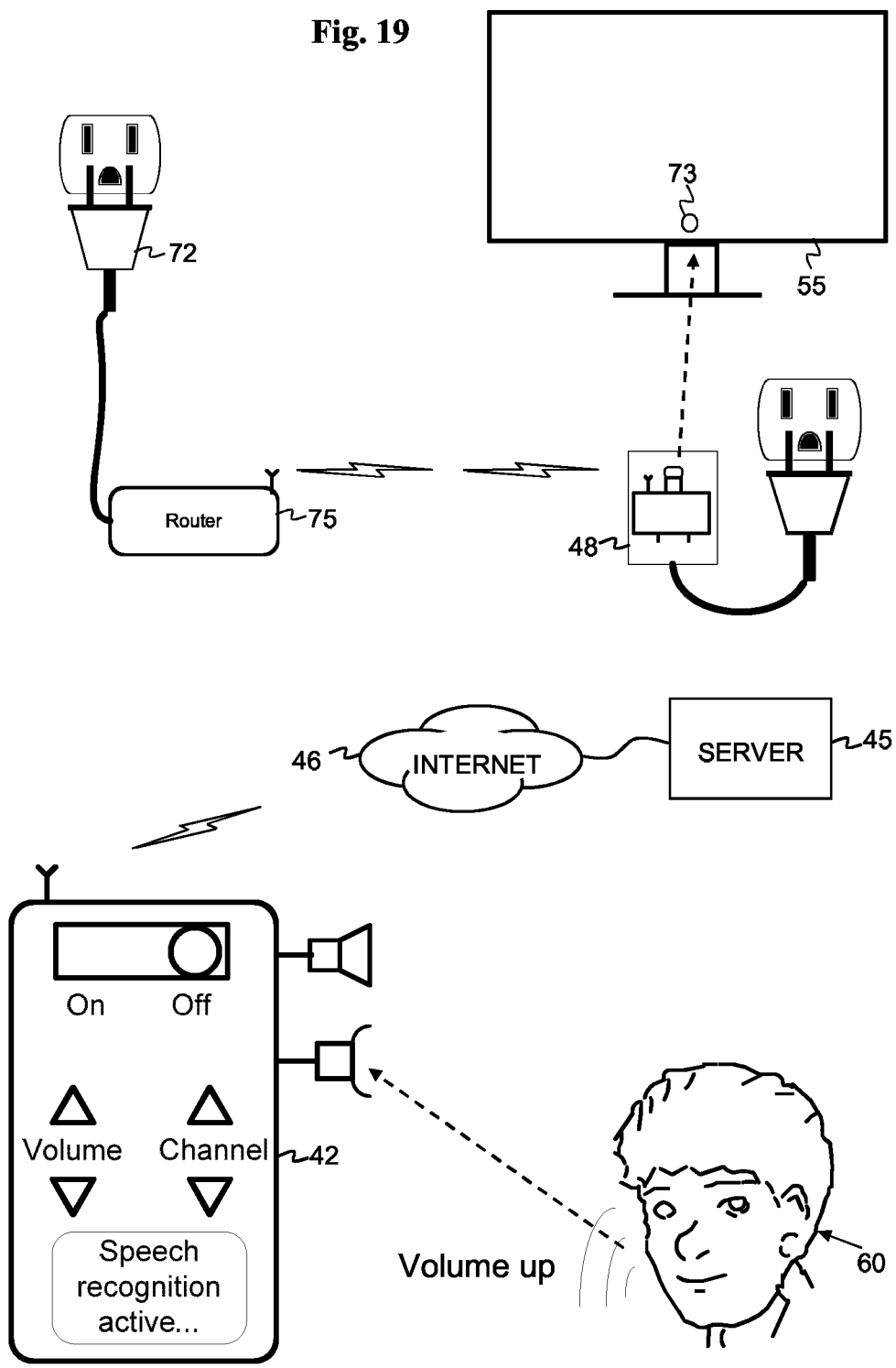
FIG. 19 is a simplified illustration of mobile device communicating with a wireless router, an IR switch, a power connection, and TV set.

Reference is now made to FIG. 19, which is a simplified illustration of mobile device 42, wireless router 75, IR switch 48, power connection 72, and TV set 55, according to one embodiment of the present invention.

Turning to FIG. 19 it is seen that a mobile device 42, equipped with a wireless Internet connection and speech-recognition capability, presents a TV controller screen to user 60. The screen includes: On/Of buttons, volume Up/Down and channel Up/Down buttons. A speech-recognition capability for mobile phones is provided, for example by Apple's Siri. Mobile device 42 is typically also equipped with room detection capability as described above with reference to FIGS. 16 and 17.

In the present example mobile device 42 has received a voice command by the user for "volume up". Based on the room wherein mobile device 42 is located, mobile device 42 determines which appliance needs to receive the command, and communicates the appliance's number and said command's number to an Internet server. A wireless router 75, in communication with the Internet server, received the appliance and command numbers, and communicates them to an IR switch 48, thereby to transmit the proper IR code to the required appliance, a TV set 55 in the present example.

Router 75 and IR switch 48 communicate wireless via Wi-Fi wireless mechanism, Zigbee specification protocol, Bluetooth wireless standard and/or any suitable wireless communication method. Alternately or in addition, wireless router 75 and IR switch 48 communicate via power-line communication, which also allows wireless router 75 to communicate with multiple IR switches 48 around the house.

Figure 20:
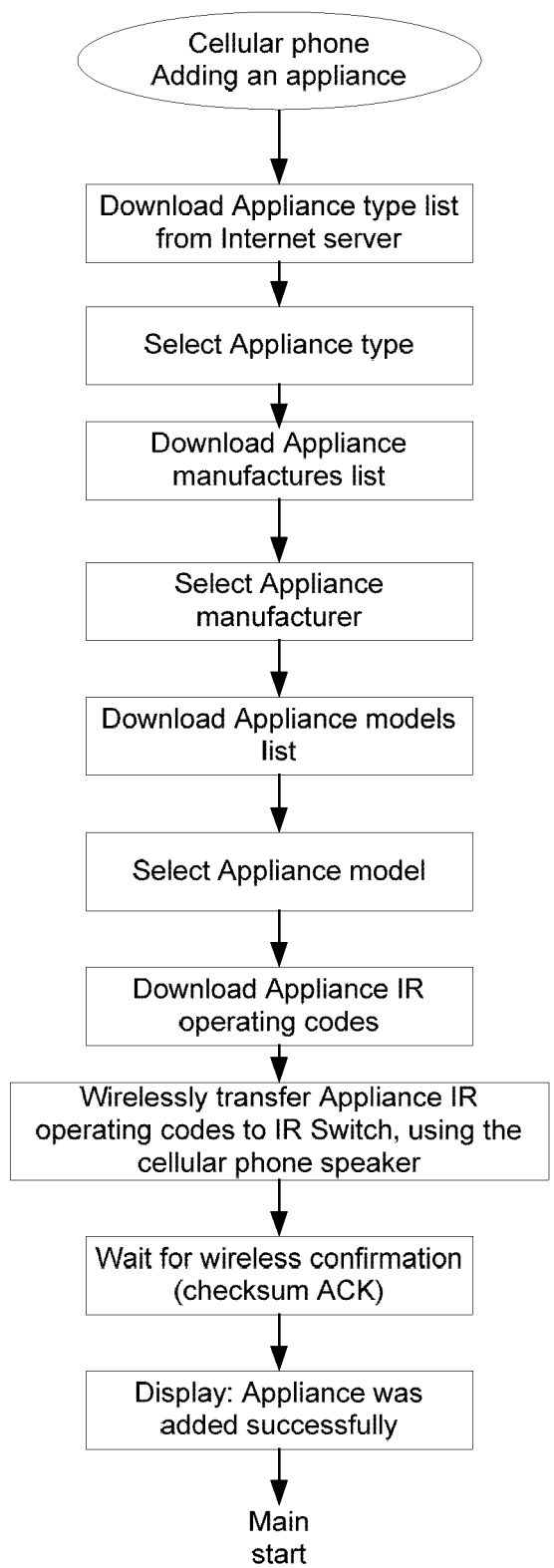
FIG. 20 is a simplified flowchart of a procedure for associating mobile device with a particular appliance.

Reference is now made to FIG. 20, which is a simplified flowchart of a procedure 76 for associating mobile device 42 with a particular appliance, according to one embodiment of the present invention.

FIG. 20 describes a procedure whereby a home appliance is added to a remote control system which is typically similar to the system described above with reference to FIGS. 9 and 10.

Turning to FIG. 20, it is seen that a mobile device presents to the user a list of appliance types such as TV sets, DVD recorders, stereo sound systems and the like, the list being typically downloaded from the Internet. Following a selection of an appliance type by the user, the mobile device downloads from the Internet and presents to the user a list of manufacturers of the appliance type. Following a selection of a manufacturer by the user, the mobile device downloads from the Internet and presents to the user a list of models of the appliance by the manufacturer. Following a selection of a model by the user, the mobile device downloads from the Internet the IR operating codes for the model, and then acoustically communicates the codes to an IR switch. Following the reception and storage of the IR codes by the IR switch, the IR switch communicates a confirmation signal to the mobile device, which in turn displays a confirmation announcement to the user.

Figure 21:
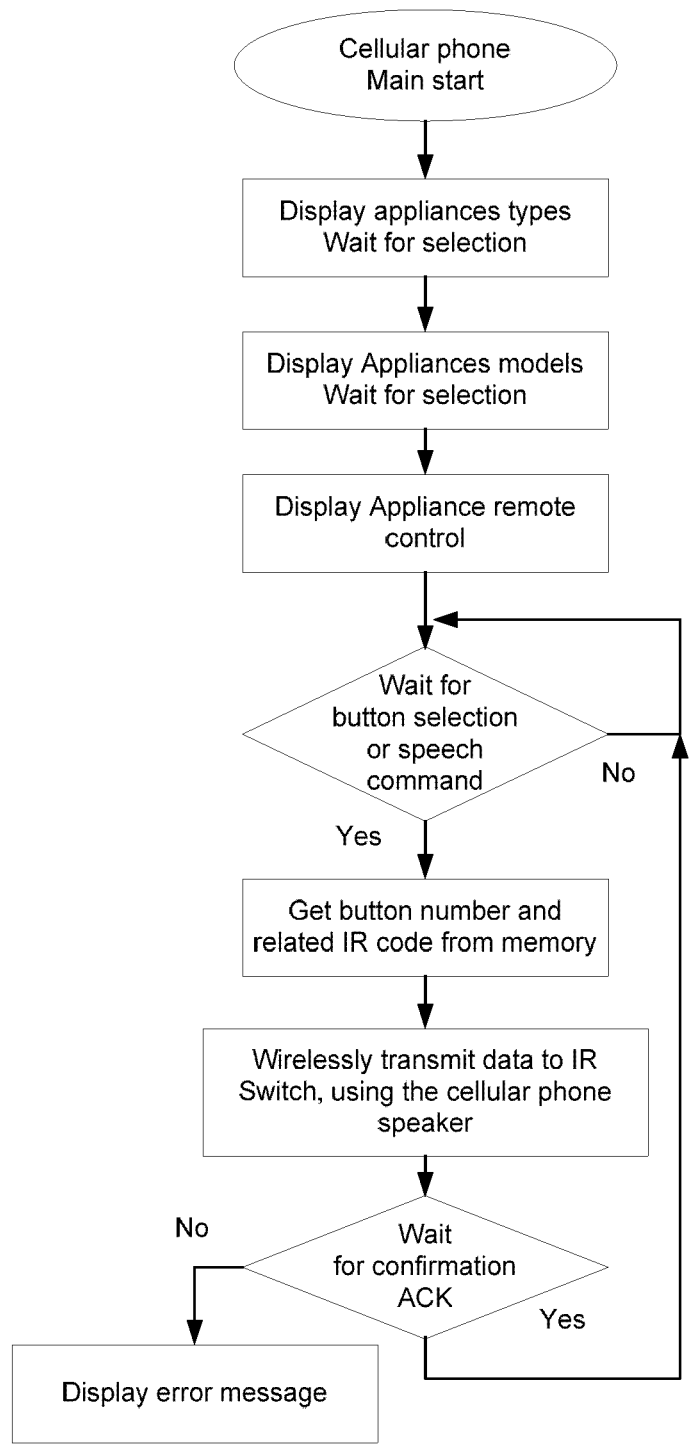
FIG. 21 is a simplified flowchart of a procedure for operating a mobile device as a remote controller with reference to FIG. 11.

Reference is now made to FIG. 21, which is a simplified flowchart of a procedure 77 for operating mobile device 42 as a remote controller, according to one embodiment of the present invention.

FIG. 21 describes a procedure for a mobile device which functions within a remote control system for home appliances, which system is typically similar to the system described above with reference to FIG. 11.

Turning to FIG. 21, it is seen that a mobile device presents to the user a list of appliance types such as TV sets, DVD recorders, stereo sound systems and the like, which list includes previously added appliances, and is typically stored on the mobile device. Following a selection of an appliance type by the user, the mobile device displays to the user a list of previously added appliance models of the selected type. Following a selection of an appliance model by the user, the mobile device displays to the user a remote-control screen for the selected model. The mobile device is now ready for receiving a control command by the user, which the user supplies by means of a button the mobile-device's touch screen and/or by voice received via the mobile-device's microphone.

Following the reception of a command by the user, the mobile device retrieves from its memory the command number and/or the related IR code for the command. The mobile device then acoustically communicates the command number to an IR switch, which is operative to retrieve from its memory the related IR code and transmits it to the required appliance. Alternately, while using an IR switch without a memory unit, the mobile device acoustically communicates to the IR switch the related IR code, which the IR switch directly transmits to the required appliance. Following the reception of an acoustic confirmation signal by the IR switch, the mobile device awaits further commands by the user. Whereas is a confirmation signal by the IR switch is not received after a prescribed delay, an error announcement is displayed to the user.

Alternately, the mobile device communicates with the IR switch via Wi-Fi, Bluetooth, Zigbee, or any other suitable wireless communication method.

Alternately, power line communication is employed, using the following system: The mobile device wirelessly communicates the command code to an Internet server, and the command is received by a power line router, which is operative to communicate the command to the required IR switches from among one or more power-line IR switches around the house.

Figure 22:
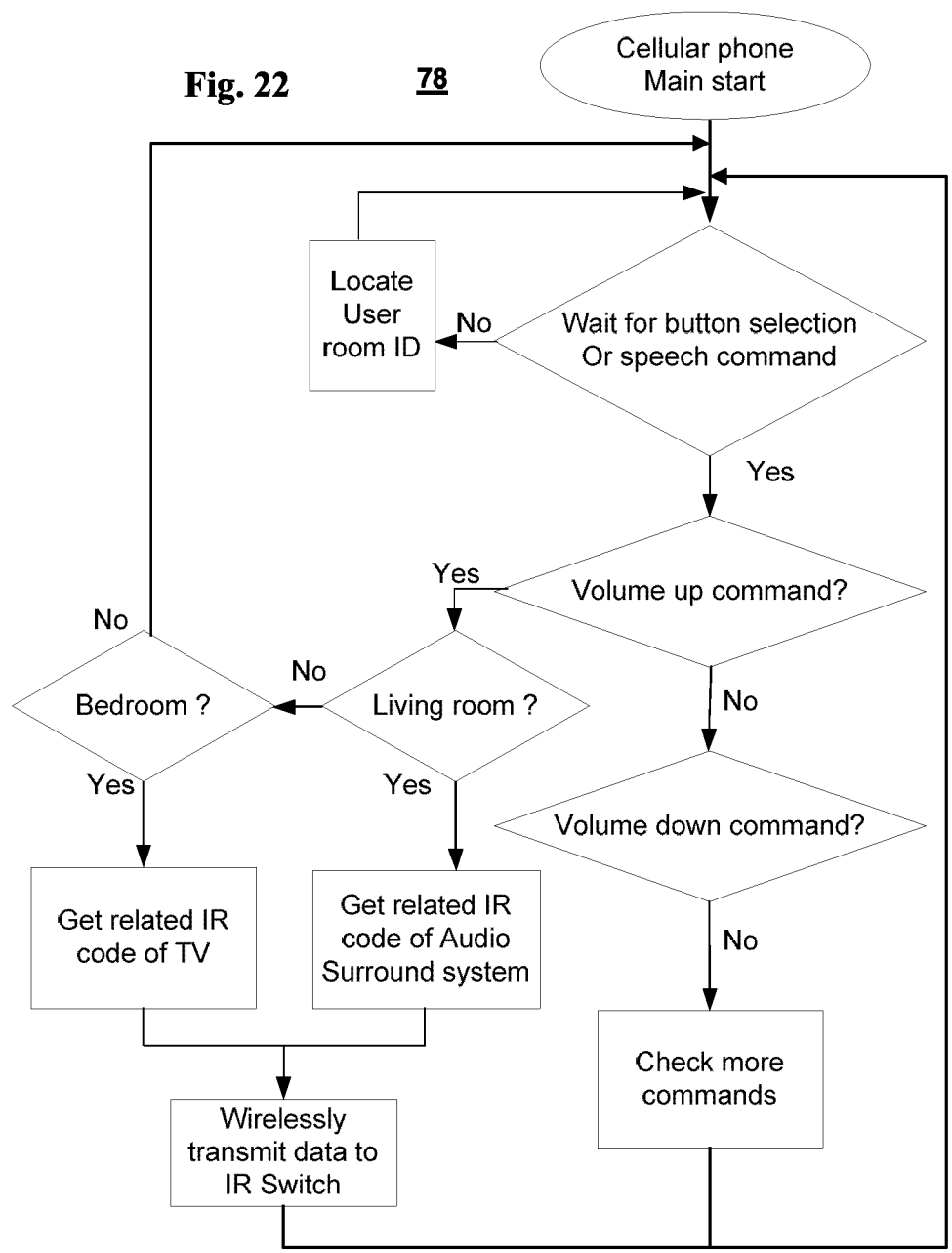
FIG. 22 is a simplified flowchart of a another procedure for operating mobile device as a remote controller with reference to FIGS. 8 and 9.

Reference is now made to FIG. 22, which is a simplified flowchart of a procedure 78 for operating mobile device 42 as a remote controller, according to one embodiment of the present invention.

FIG. 22 describes a procedure for a mobile device which functions within a remote control system for home appliances, which system is typically similar to the system described above with reference to FIGS. 8 and 9.

Turning to FIG. 22, it is seen that a mobile device is ready to receive a button or voice command be a user, while continuously tracking the user room ID. Room ID is typically tracked via beacon signals by IR switches, which are located in different rooms and communicate, typically acoustically, the room ID to the mobile device. Once a command by the user is received by the mobile device, such as "volume up" in the present example, the mobile device retrieves the related IR code for the required appliance based on the user room ID. In the present example, in the bedroom the required appliance is the TV set, whereas in the living room the required appliance is the audio surround system. The related IR code for executing the command for the required appliance is the acoustically communicated by the mobile device to the IR switch, which is operative to transmit the required IR code to the appliance in question.

Figure 23A:
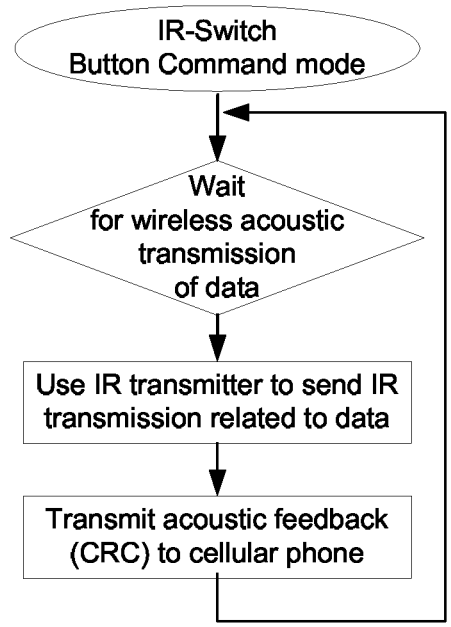
FIG. 23A and FIG. 23B are two simplified flowcharts of corresponding procedures for an IR switch.
Figure 23B:
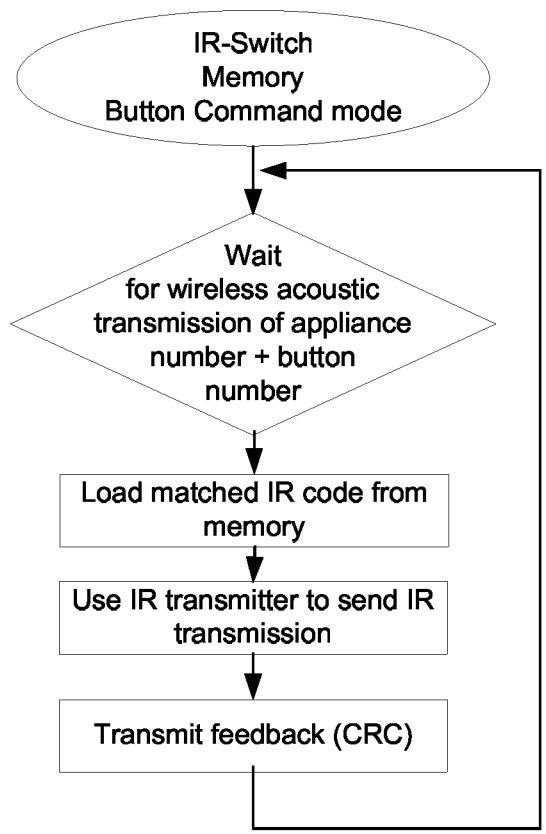

Reference is now made to FIG. 23A and FIG. 23B, which are two simplified flowcharts of procedures 79 and 80 for an IR switch 48, according to one embodiment of the present invention.

FIGS. 23A and 23B describe procedures for an IR switch which functions within a remote control system for home appliances, which system is typically similar to the system described above with reference to FIG. 11. FIG. 23A describes a procedure for an IR switch 48 that typically does not include a considerable memory unit. FIG. 23B describes a procedure for an IR switch 48 that includes a memory unit being operative to store one or more IR code libraries for one or more appliances.

Turning to FIG. 23A, it is seen that an IR switch receives an acoustic transmission of data, typically by a mobile device. The data includes a description of an IR code, which the IR switch is operative to transmit via its IR transmitter. Following the IR transmission, the IR switch acoustically communicates a confirmation signal to the mobile device. According to the procedure of FIG. 23A, the IR switch typically requires only a very small memory which includes the IR code for "1" and "o". Namely, the acoustic signal by the mobile phone includes a series of bits, each of which is either 1 or 0, and the IR switch converts each bit to a proper IR signal such as, for example: "1"=20 milliseconds IR signal +10 milliseconds no-signal; and "0"=10 milliseconds IR signal +20 milliseconds no-signal.

Turning to FIG. 23B, it is seen that an IR switch receives an acoustic transmission of an appliance number and an appliance number, typically by a mobile device. The appliance and button numbers refer to appliance data which were previously added to the control system, typically as described above with reference to FIG. 20. The IR switch then retrieves from its memory unit the IR code that is related to the button for the appliance, as previously stored, for example, in the course of an "add appliance" procedure of FIG. 20. The IR switch then transmits the IR code via its IR transmitter. Following the IR transmission, the IR switch acoustically communicates a confirmation signal to the mobile device.

Figure 24:
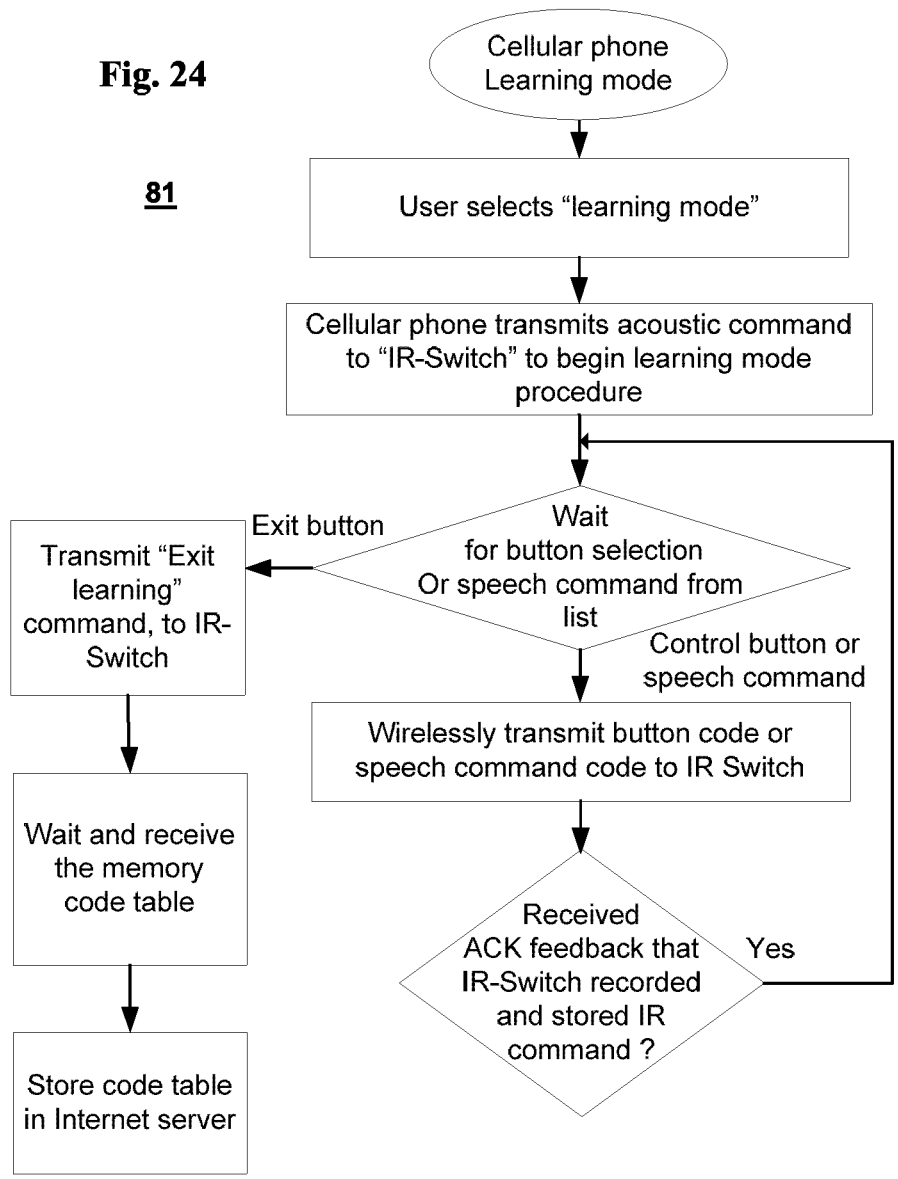
FIG. 24 is a simplified flowchart of a learning mode procedure in a mobile device.

Reference is now made to FIG. 24, which is a simplified flowchart of a procedure 81 for an mobile device 42 in a learning mode, according to one embodiment of the present invention.

FIG. 24 describes a procedure for a mobile device which functions within a remote control system for home appliances, which system is typically similar to the system and learning mode as described above with reference to FIG. 12.

Turning to FIG. 24 it is seen that in response to selecting a learning mode by the user, the mobile device acoustically communicates a signal to the IR switch, thereby to cause the IR switch to enter the learning mode. Then, in response for a button or voice command by the user, the mobile device acoustically communicates the command code to the IR switch. A feedback signal by the IR switch is then received the mobile device, which is then ready to receive another button or voice command by the user. The feedback signal is transmitted by the IR switch after an IR code which corresponds to the command code has been received by the IR switch. The IR code has been supplied by the user via a remote controller of the appliance in question. The process is repeated until all the required button codes have been transmitted to the IR switch and the storage of their corresponding IR codes has been confirmed. Then, following an exit command by the user, the mobile device acoustically communicates an exit signal to the IR switch, thereby to cause the IR switch to communicate the entire code table including all the IR codes that have been received through the learning process. The code table is then uploaded by the mobile device to the Internet, thereby to be available for future download by the same or other users.

Figure 25:
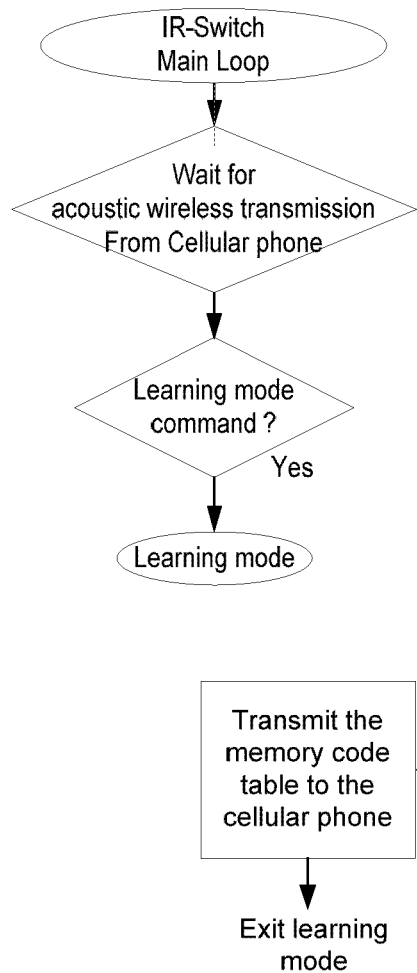
FIG. 25 is a simplified flowchart of a procedure for an IR switch in a learning mode.
Figure 25:
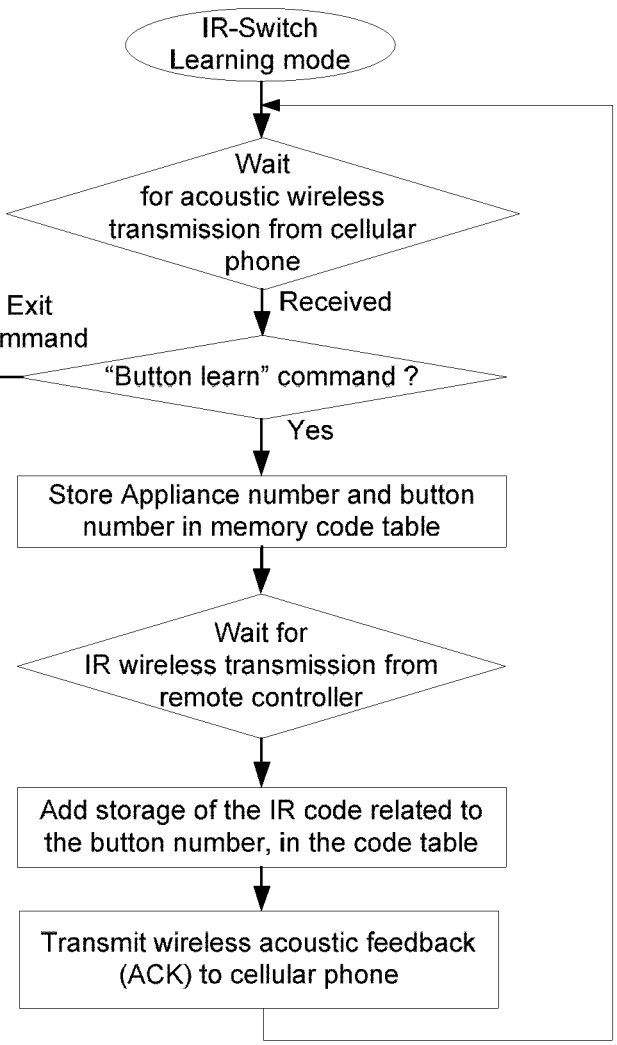

Reference is now made to FIG. 25, which is a simplified flowchart of a procedure 82 for an IR switch 48 in a learning mode, according to one embodiment of the present invention.

FIG. 25 describes a procedure for an IR switch which functions within a remote control system for home appliances, which system is typically similar to the system and learning as described above with reference to FIG. 12.

Turning to FIG. 25 it is seen that an IR switch enter a learning mode following a transmission of a learning mode command by a mobile device. The IR switch then receives an acoustic transmission from the mobile device, informing the IR switch of an appliance number and a button number. The numbers are then stored on the IR switch in a memory code table, and the IR switch awaits a transmission of the corresponding IR code, which the user supplies via the remote controller of the appliance. Once received by the IR switch, the IR code is stored in the memory code table, together with the appliance and button numbers to which it is related. A feedback signal is then transmitted the mobile device, thereby to inform the user that another button can be selected. The process is repeated until all the required IR codes have been received by the IR switch and their storage in the memory code table has been confirmed. When a transmission of an exit command is received from the mobile device, the IR switch transmits to the mobile device the entire memory code table and exists the learning mode.

Figure 26:
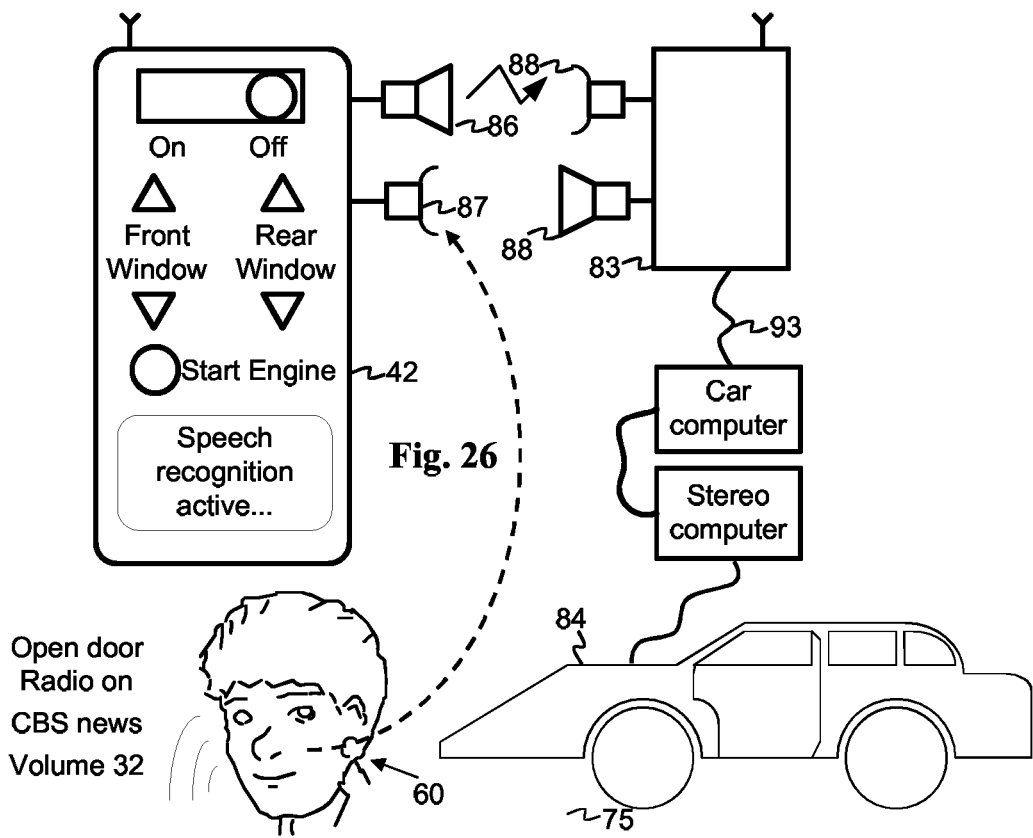
FIG. 26 which is a simplified illustration showing a mobile device communicating with a CANbus switch a and vehicle.

Reference is now made to FIG. 26, which is a simplified illustration showing a mobile device 42, a CANbus switch 83, and a vehicle 84, according to one embodiment of the present invention.

Turning to FIG. 26 it is seen that a mobile device 42, equipped with speech-recognition capability, presents a vehicle controller screen to the user including: On/Of buttons, front window Up/Down and rear window Up/Down buttons, and a start-engine button. A speech-recognition capability for mobile phones is provided, for example by Apple's Siri. Mobile device 42 communicates acoustically with an CANbus switch 85, via speaker 86 and microphone 87 on mobile device 42, and speaker 88 and microphone 89 on CANbus switch 90. Alternately, Mobile device 42 and CANbus switch 91 communicate via an RF method such as Wi-Fi, Zigbee, Bluetooth and the like.

CANbus switch 92 is connected to the vehicle CANbus 93, a central controller system for the vehicle appliances, and is thereby operative to control the appliances. Alternately of in addition, CANbus switch 94 is operative transmit IR code, thereby to control at least some of the appliances.

Based on the vehicle's model and appliances, a controller unit is downloaded to the mobile device from the Internet, including all the control functions that required for the appliances. A stereo audio system, for example, is also connected to the vehicle's CANbus 93, and can be controlled via this system.

In the present example, the user has given a series of speech commands—"Open Door", "Radio On", "CBS news", and "Volume 32"—which are received by mobile device 42 via microphone 87. Mobile device 42 detects the user's presence in the vehicle, based, for example, on beacon transmission from CANbus switch 95. Mobile device 42 is therefore operative to transmit an acoustic command to CANbus 93, causing CANbus 93 to activate the required appliances.

Figure 27:
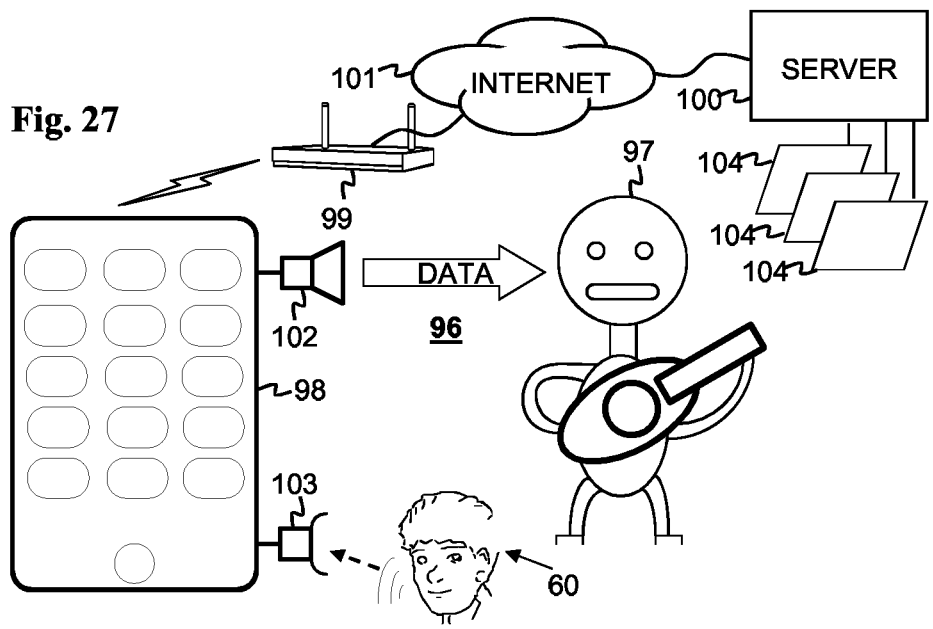
FIG. 27 is a simplified illustration of an acoustic toy system.

Reference is now made to FIG. 27, which is a simplified illustration of an acoustic toy system 96, according to one embodiment of the present invention.

Turning to FIG. 27, it is seen that acoustic toy system 96 includes a toy 97, a handheld device 98 such as a Smartphone or iPad, a wireless router 99 communicating with handheld device 98, and a remote server 100, which is typically available for communication via a communication network 101 such as the Internet, Handheld device 98 typically includes a speaker 102 and a microphone 103. Server 100 typically stores data files 104, including sound files.

As seen in FIG. 27, the voice of a user 60 is received by microphone 103 of handheld device 98. Typically, handheld device 98 is placed next to toy 97, so that user 60, typically a child, receives the impression of talking to toy 97. The user's voice input is typically analyzed by a speech-recognition engine, which runs on handheld device 98, such as the Siri speech-recognition engine by Apple. Alternately or in addition, a speech-recognition engine is provided on server 100, with which handheld device 98 communicates via wireless router 99.

Having analyzed the user's voice-input, server 100 provides an appropriate response to be provided to the user via toy 97. In the present example, user 60 says "Can you sing?" Having detected the user's speech, server 100 selects a suitable data file 104, such as a song title from a suitable song database. The selection is typically based on the user's profile. Server 100 then generates a verbal response and communicates it to handheld device 98. The verbal response is typically generated in the form of data packets of condensed coded audio, which are suitable to be spread in an acoustic transmission, thereby to be provided via toy 97.

Alternately, server 100 generates a text response and communicates it to handheld device 98, which in turn generates the digital coded audio, to be spread in an acoustic transmission.

Typically, server 100 provides not only audio data for toy 97, but also puppeteering data, which determine the position of a toy's one or more motors in a manner which is synchronized with the toy's audio content. Content data, which include both audio content and synchronized motions for toy 97, are therefore communicated by server 100 to handheld device 98.

Handheld device 98 typically communicates with toy 97 by means of an acoustic transmission, which device 98 transmits via speaker 102 and which is received by toy 97 via a suitable microphone on toy 97. The acoustic transmission typically includes a low-volume transmission in the frequency range of 15-20 KHz, namely on the upper verge of the audible range. Being low-volume, this transmission is effectively inaudible to the human ear. This acoustic transmission channel is operative to transmit data bits of a condensed coded audio, and is therefore suitable for the transmission of audio data for toy 97, as well as synchronized puppeteering data (also available as data file 104). Alternately or in addition, handheld device 98 communicates with toy 97 via Bluetooth, WiFi, IR transmission or any other wireless transmission which is suitable for the transmission of data bits of condensed audio and puppeteering data.

An acoustic transmission including condensed coded audio is received by toy 97 and processed by a DSP unit on toy 97. Typically, the acoustic transmission is digitized, thereby to locate the data bits of condensed audio. The data bits are edited into a digital audio file, typically using a VoCoder, such as G723 Vocoder, which is operative to encode or condense and redevelop digital audio data. The digital audio file is then transmitted acoustically from the handheld device 98 to the toy 97, and converted back into analogue using G723 decoder, and provided as an audible audio content by toy 97 via a speaker on toy 97. The acoustic transmission typically also include synchronized puppeteering data, based on which the DSP unit of toy 97 activates on or more motors of toy 97, thereby to move the toy's eyes, lips, arms and/or any other part, synchronized with the toy's audio output. The acoustic transmission typically also include a toy ID number, to enable the handheld device to communicate with plurality of toys, each has its unique ID number.

It is appreciated that throughout the procedure of the acoustic toy system of FIG. 27, the user only hears the audio output that is provided via toy 97, while all other wireless transmissions—including the acoustic transmission of coded audio which handheld device 98 communicates to toy 97—remain inaudible to the user.

It is also appreciated that the acoustic toy system of FIG. 27 is particularly advantageous in that it receives a voice-input by a user via handheld device 98, while providing an audio output via toy 97. This particular construction avoids the need for an expensive microphone on toy 97, as well as the need for a wireless channel for high rate data from the toy to the handheld device, which would be required for the transmission of audio for the purpose of speech-recognition. The toy can therefore be made cheaper, requiring only a microphone for the reception of coded data and a speaker for providing regular audio output. At the same time, through its communication with handheld device 98, toy 97 receives all the benefits of Internet connectivity including the song database on server 100, as well as the speech recognition engine, which it typically provided via the handheld device itself.

Figure 28:
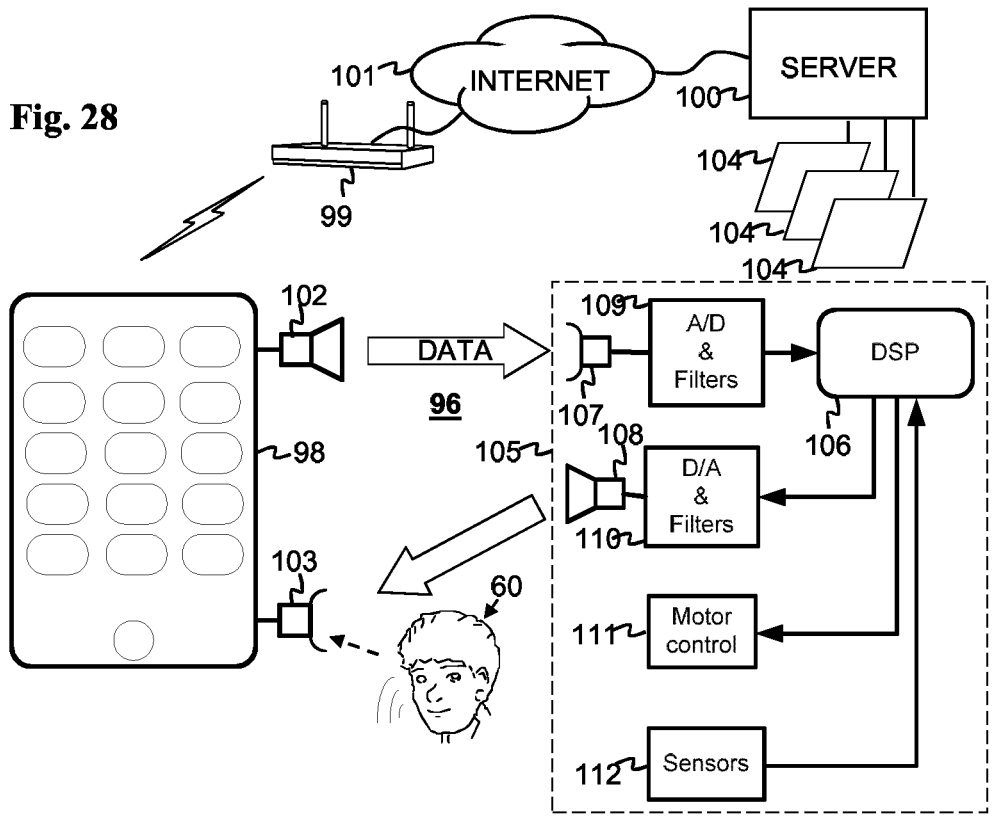
FIG. 28 is a simplified schematic illustration of the acoustic toy system with a block diagram of a toy.

Reference is now made to FIG. 28, which is a simplified schematic illustration of acoustic toy system 96, with a block diagram 105 of toy 97, according to one embodiment of the present invention.

FIG. 28 shows a typical interior construction of acoustic toy 97 (represented in FIG. 28 by block diagram 105), which is provided as part of an acoustic toy system 96, which might be similar to the system described above with reference to FIG. 27. Turning to FIG. 28 it is seen that acoustic toy system 96 includes toy 97, wireless router 99 communicating with handheld device 98, and remote server 100 typically communicating via the Internet and via wireless router 99 with handheld device 98.

As seen in FIG. 28, 97 typically includes a DSP unit 106, a microphone 107, a speaker 108, an analogue-to-digital converter 109, a digital-to-analogue converter 110, one or more motor controllers 111, and one or more sensors 112, all controlled by DSP unit 106. Handheld device 98, such as a Smartphone or iPad, typically includes a speaker 102 and a microphone 103, As seen in FIG. 28, a user's voice input is received by microphone 103 on handheld device 98. Typically, handheld device 98 is placed next to toy 97, so that user 60, typically a child, receives the impression of talking to toy 97. The user's voice input is typically analyzed by a speech-recognition engine, which runs on handheld device 98, such as the Siri speech-recognition engine by Apple. Alternately or in addition, a speech-recognition engine is provided on server 100, with which handheld device 98 communicates via wireless router 99.

Having received a request for a song by the user, server 100 retrieves a data file 104, such as a song title from a suitable song database, typically based on the user's personal profile including the user's age, native language, and/or history of previous requests. Server 100 then generates a data file for a response to be made by toy 97, which data file typically includes packets of condensed audio data as well as synchronized puppeteering data (also available as data file 104). The one or more data files 104 are then communicated to handheld device 98, which is operative to transmit it coded within an inaudible acoustic transmission.

Handheld device 98 typically communicates with toy 97 using acoustic transmission. Handheld device 98 transmits the one or more data files 104 coded as acoustic transmission via speaker 102. The coded acoustic transmission is then received by via microphone 107 on toy 97.

The acoustic transmission typically includes a low-volume transmission in the frequency range of 15-20 KHz, namely on the upper verge of the audible range. Being low-volume and high frequency, this transmission is effectively inaudible to the human ear. This acoustic transmission channel is operative to transmit data bits of a condensed coded audio, and is therefore suitable for the transmission of audio data for the toy, as well as synchronized puppeteering data. Alternately or in addition, handheld device 98 communicates with the toy 97 via Bluetooth, WiFi, IR transmission or any other wireless transmission which is suitable for the transmission of data bits of condensed audio and puppeteering data.

Having received the acoustic transmission by handheld device 98 via microphone 107, the toy using the DSP 106, converts the transmission into a digital data file via analogue-to-digital converter 109. DSP unit 106 receives the digital data file, locates the condensed audio packets, encodes and redevelops them using typically G723 algorithms, and converts them into a digital audio data. The audio data is converted by digital-to-analogue converter 110, and then provided as audio output via speaker 108. DSP unit 106 also locates the synchronized puppeteering data in the digital data file, and actuates motor controllers 11 according to the puppeteering data.

It is appreciated that toy 97 can sing and make synchronized motions in accordance with request made by the user, without the user being aware of the data transmissions between the server, the handheld device and toy 97.

DSP 106 also operative to receive feedback indications via one or more sensors 112 on toy 97, which are then coded and communicated to handheld device 98 in an acoustic transmission via speaker 108. The same acoustic transmission from the toy to handheld device 98 typically also includes indications on the toy's status such as toy battery-low alert and the like. It is appreciated that this acoustic return channel, while not being essential to the voice interactivity of the acoustic toy system, involves only coded data which do not require high rate and are therefore appropriate to inexpensive speaker and DSP 106 on toy 97. Alternately, sensor feedback and toy status indications are communicated by toy 97 to handheld device 98 via Bluetooth, WiFi, or any other suitable wireless communication transmission.

Figure 29:
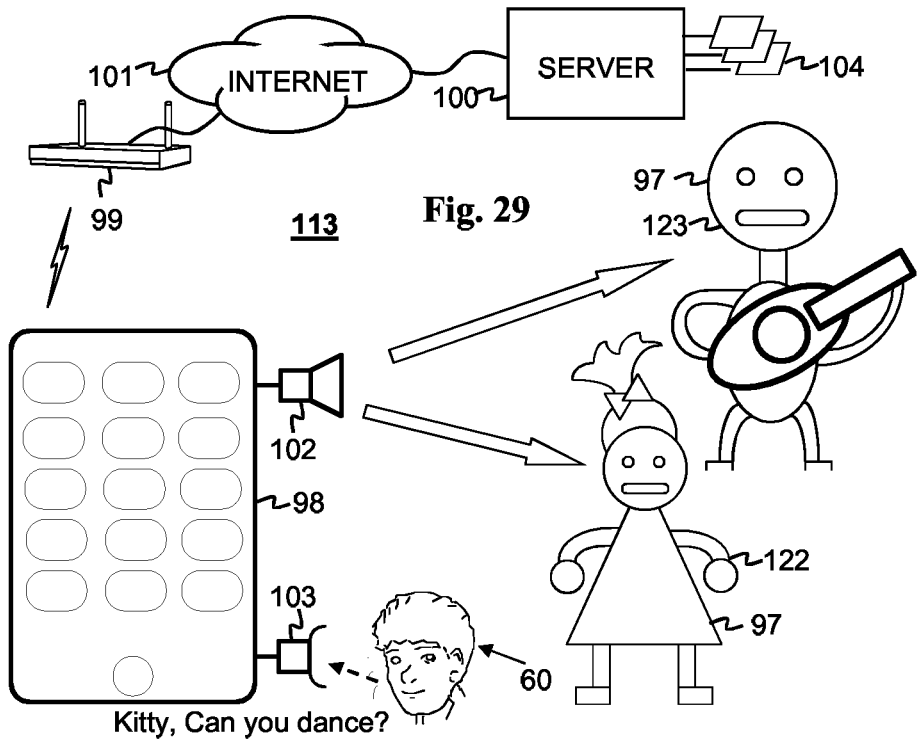
FIG. 29 is a simplified illustration of an acoustic multi-toy system.

Reference is now made to FIG. 29, which is a simplified illustration of an acoustic multi-toy system 113, according to one embodiment of the present invention.

FIG. 29 shows an acoustic toy system including a plurality of toys 97. Multi-toy system 113 may be similar to the acoustic toy system 96 described above with reference to FIGS. 27 and 28. Turning to FIG. 29, it is seen that an acoustic toy system 113 includes a plurality of toys 114, a handheld device 115 such as a Smartphone or iPad, a wireless router 116 communicating with handheld device 98, and a remote server 117, which is typically available for communication via a communication network 118 such as the Internet. Handheld device 98 typically includes a speaker 119 and a microphone 120. Server 100 typically stores data files 121, including sound files. Toys 97 are typically situated in the vicinity of handheld device 98. Typically, each toy is registered upon being purchased, typically via a home computer, by providing a toy's unique ID as well as a toy's name, which may be selected by the user.

As seen in FIG. 29, user 60 voice input is received by microphone 103 on handheld device 98. Typically, handheld device 98 is placed next to one or more toys, so that a user, typically a child, receives the impression of talking to one of the toys. The user's voice input is typically analyzed by a speech-recognition engine, which runs on handheld device, such as the Siri speech-recognition engine by Apple. Alternately or in addition, a speech-recognition engine is provided on server 6, with which handheld device 98 communicates via wireless router 99.

In the present example, the system detects an address by the user to particular toy 97 designated by numeral 122.

Addressing the toy 122 is based on the toy's name as registered on server 100. Server 100 generates a particular data file 104 for a response to be made by toy 122. The data file 104 typically includes both the toy ID of toy 122, as well as packets of condensed audio data. The data file 104 typically also includes synchronized puppeteering data. The data file 104 is then communicated to handheld device 98, which is operative to transmit it coded within an inaudible acoustic transmission.

Handheld device 98 typically communicates with one or more toys 97 by means of an acoustic transmission. Handheld device 98 transmits an acoustic transmission via speaker 102 which is received by toys 97 via suitable microphone embedded in toys 97. The acoustic transmission typically includes a low-volume transmission in the frequency range of 15-20 KHz, namely on the upper verge of the audible range. Being low-volume, this transmission is effectively inaudible to the human ear. This acoustic transmission channel is operative to transmit data bits of a condensed coded audio, and is therefore suitable for the transmission of audio data as well as synchronized puppeteering data for the toys. Alternately or in addition, handheld device 98 communicates with toys 97 via Bluetooth, WiFi, IR transmission or any other wireless transmission which is suitable for the transmission of data bits of condensed audio and puppeteering data.

In the present example, the acoustic transmission by handheld device 98 includes the toy ID of toy 122, and therefore the transmission is received and processed only by a DSP unit on toy 122 (and not by toy 97 designated by numeral 123). Typically, the acoustic transmission is digitized, thereby to locate the data bits of condensed audio. The data bits are transmitted acoustically to toy 97, and encoded back to audio, typically using a VoCoder, such as G723 Vocoder, which is operative to decode and redevelop digital audio data. The digital audio data is then converted into analogue and provided as an audible audio content by toy 97 via a speaker on toy 97. The acoustic transmission typically also include synchronized puppeteering data, based on which the DSP unit of toy 122 activates one or more motors of toy 122, thereby to move the toy's eyes, lips, arms and/or any other part, synchronized with the toy's audio output.

It is appreciated that the acoustic toy system of FIG. 29 allows a user to address a particular toy out of group of toys 97, while the user's voice input is received via a handheld device 98 which is placed in the vicinity of toys 97. Furthermore, the same toy 97 can be interacted with, using different handheld devices 98, since the toy details are registered on a remote Internet server.

Figure 30:
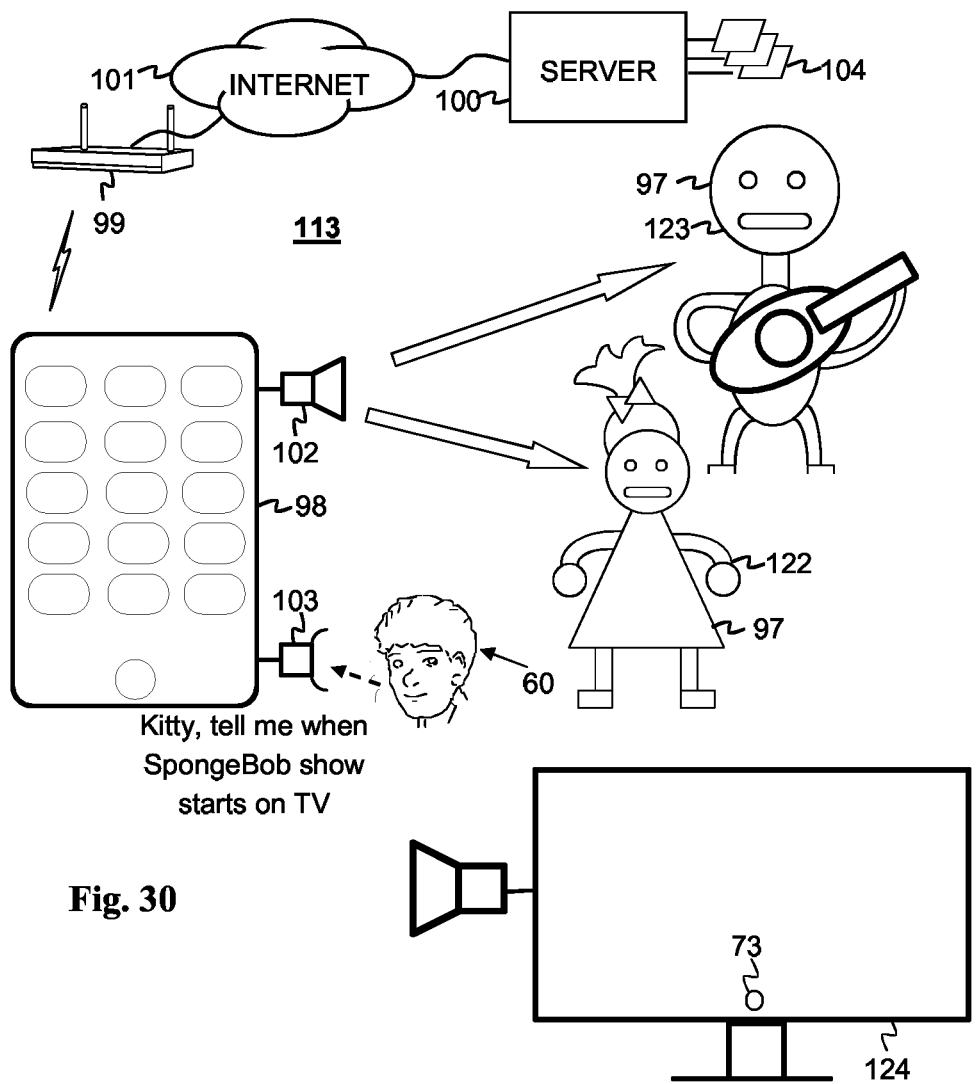
FIG. 30 is a simplified illustration of the acoustic toy system and a TV set.

Reference is now made to FIG. 30, which is a simplified illustration of an acoustic toy system 113 and a TV set 124, according to one embodiment of the present invention.

As seen in FIG. 30, a user's voice input is received by microphone 103 on handheld device 98. Typically, handheld device 98 is placed next to one or more toys, so that a user, typically a child, receives the impression of talking to one of the toys. The user's voice input is typically analyzed by a speech-recognition engine, which runs on handheld device 98, such as the Siri speech-recognition engine by Apple. Alternately or in addition, a speech-recognition engine is provided on server 100, with which handheld device 98 communicates via wireless router 99.

In the present example, the system detects a request by the user ("Kitty, tell me when SpongeBob show starts on TV") to receive, via toy 122, a notification of a particular TV show. Server 100 generates a data file for a response to be made by toy 122, which data file typically includes both the toy ID of toy 122, as well as packets of condensed audio data. The data file typically also includes synchronized puppeteering data. The data file is then communicated to handheld device 98, which is operative to transmit it coded within an inaudible acoustic transmission.

Server 6 also generates a notification script that allows the system to provide a notification to the user via toy 122, once the TV-show requested by the user starts. The notification script is communicated to handheld device 98, transmitted acoustically to toy 122 via speaker 102, and sets the DSP unit on toy 122 to await the TV-show. The TV-show is typically to be detected via unique TV-show data which are included in the TV audio. Typically, a TV show data are coded into the TV audio and spread along the TV audio file, for example, every 0.1 second. The data typically include a TV show ID number and TV time line data, thereby allowing the detection not only of the TV show itself, but also the exact position along the TV show's episode.

Once the TV show starts on TV set 7, an acoustic transmission of the previously coded TV-show's details is provided via speaker 8. The acoustic transmission is received by toy 122, via a suitable microphone, and the TV-show data coded therein are detected by the DSP unit on toy 122. A notification is then transmitted acoustically or via other means of wireless transmission such as Bluetooth or WiFi, from toy 122 to handheld device 98, which communicates the notification to server 100. It is appreciated that this data transmission from toy 122 to handheld device 98 does not involve high data rates. Alternately, the acoustic transmission by TV-set 124 is received directly by handheld device 98, and the TV-show data coded therein are detected by a processor on handheld device 98. Still another option is that the acoustic transmission by TV-set 7 is received by server 100 via microphone 103 on handheld device 98.

Once a notification is received by server 100, a synchronized data file for toy 122 is communicated by server 6 to handheld device 98, thereby to be acoustically transmitted to toy 122. Toy 122 then verbally notifies the user that the requested TV-show has begun, and typically provides audio output as well as motions which are synchronized with the TV-show. In particular, toy 122 provides one or more verbal notifications to the user, notifying the user that a specific point along the TV-show's timeline has been reached.

Alternately, a TV-show is detected by handheld device 98 via a speech-recognition engine on the device 98, detecting, for example, a key sentence at the beginning of an episode. This option avoids the need to provide previously coded TV-show data inside the TV-show audio file. However, employing previously coded TV-show data which can be detected acoustically as mentioned above, allows for a higher detection range.

It is appreciated that the systems described above with reference to FIGS. 27, 28, 29, and 30 enable communicating audio, such as sound and speech, over audio. The acoustic communication technology used by the systems of FIGS. 27, 28, 29, and 30 enables transmission of a compressed audio file within the upper part of the audio band, where, for example, the audio band is 15 Hz-20 KHz, and the upper band is 15 KHz-20 KHz.

It is appreciated that the systems described above include two devices or more, where each device includes a processor, a memory, a speaker for providing sound to a user, a microphone for receiving sound from a user, an audio compression module, and/or an audio decompression module, and a software program stored in the memory and executed by the processor. The software program uses the speaker and/or the microphone to communicate acoustic communication, where the first device compresses audio, and transmits it using the acoustic communication, and the second device receives the compressed audio using the acoustic communication, and decompresses the communicated compressed audio.

It is therefore possible to communicate at the same time (concurrently) uncompressed audio, compressed audio, and data (e.g. control signals such as puppeteering data). For example, it is possible to transmit via a TV speaker, in addition to the broadcasted audio, compressed audio files and puppeteering data to a toy.

Figure 31:
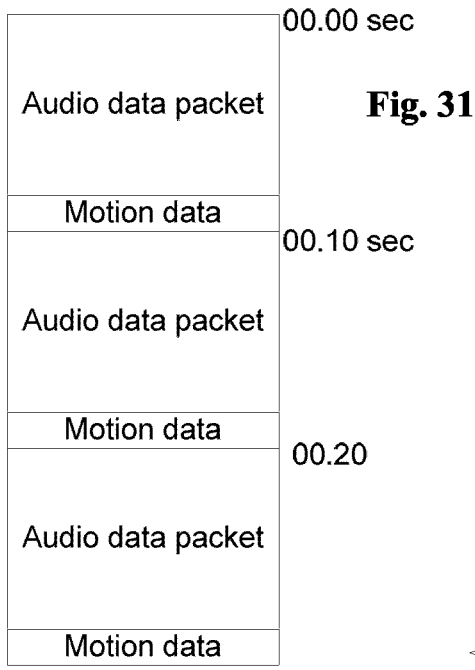
FIG. 31 is a simplified block-diagram of a toy audio file as used by the acoustic toy system.

Reference is now made to FIG. 31, which is a simplified block-diagram of a toy audio file, according to one embodiment of the present invention. The toy audio file of FIG. 31 is typically employed in accordance with an acoustic toy system which may be similar to the acoustic toy system described above with reference to FIG. 27.

Turning to FIG. 31, it is seen that a toy audio file includes audio data packets of 0.1 second length, each packet includes a synchronized motion data, which updates the position of the toy's one or more motors. The toy's motors typically control the toy's head, arms, eyes motion, and the like. It is appreciated that employing the toy audio file of FIG. 31 in an acoustic toy system as described above with reference to FIG. 27, allows the activation of a toy to provide audio output as well as motions that are synchronized therewith.

Figure 32:
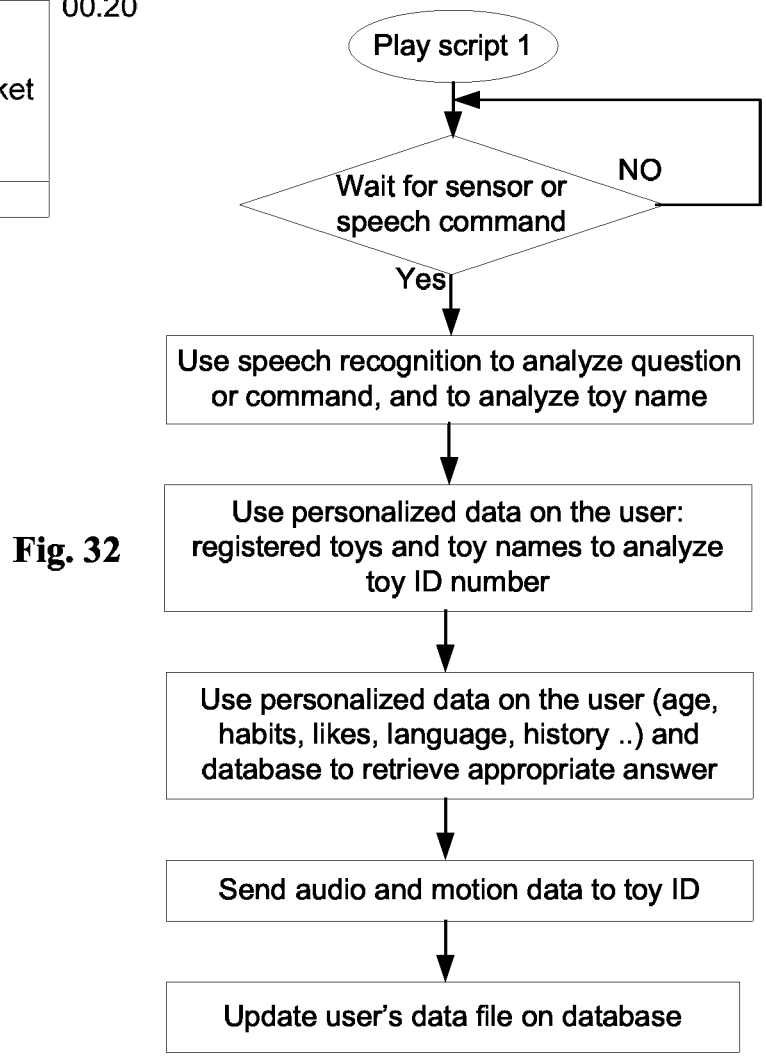
FIG. 32 is a simplified flowchart of a play script as used by the acoustic toy system.

Reference is now made to FIG. 32, which is a simplified flowchart of a play script, according to one embodiment of the present invention. The play script of FIG. 32 is typically employed in accordance with an acoustic toy system which may be similar to the acoustic toy system described above with reference to FIG. 29. A play script is typically run on a suitable Internet server such as server 100 of FIG. 29 and/or on handheld device such as handheld device 98 of FIG. 29, which may be a Smartphone or an iPad.

Turning to FIG. 32 it is seen that an acoustic toy system awaits a sensor indication or a voice input by a user. A voice input by a user is typically received by a handheld device that is placed next to a toy, and analyzed by the handheld device via a suitable speech-recognition engine such as Siri by Apple. The system detects, for example, a user request for a song, and a toy's name. Using the user's previously registered personal details, which include toy ID's and names of the toys owned by the user, the system is operative to determine the toy ID number of the toy addressed by the user. Using the user's previously registered details including age, habits, language and history of previous requests, the system is operative to make an appropriate selection of a content item for the user: For example, in response to a user's request for a song, the system selects from a music database, a song that most strongly matches the above-mentioned personal details of the user.

Having retrieved an appropriate response to the user, the system generates a data file for the toy in question, which data file typically includes condensed audio data, synchronized motion data, and a toy ID number. Typically the data file is generated by an Internet server, communicated to the user's handheld device, which in turn transmits it acoustically to the required toy. The user's personal data file on the server database is then updated with the details of the interaction including, for example, a request for a song by the user, and the particular content provided to the user.

Figure 33:
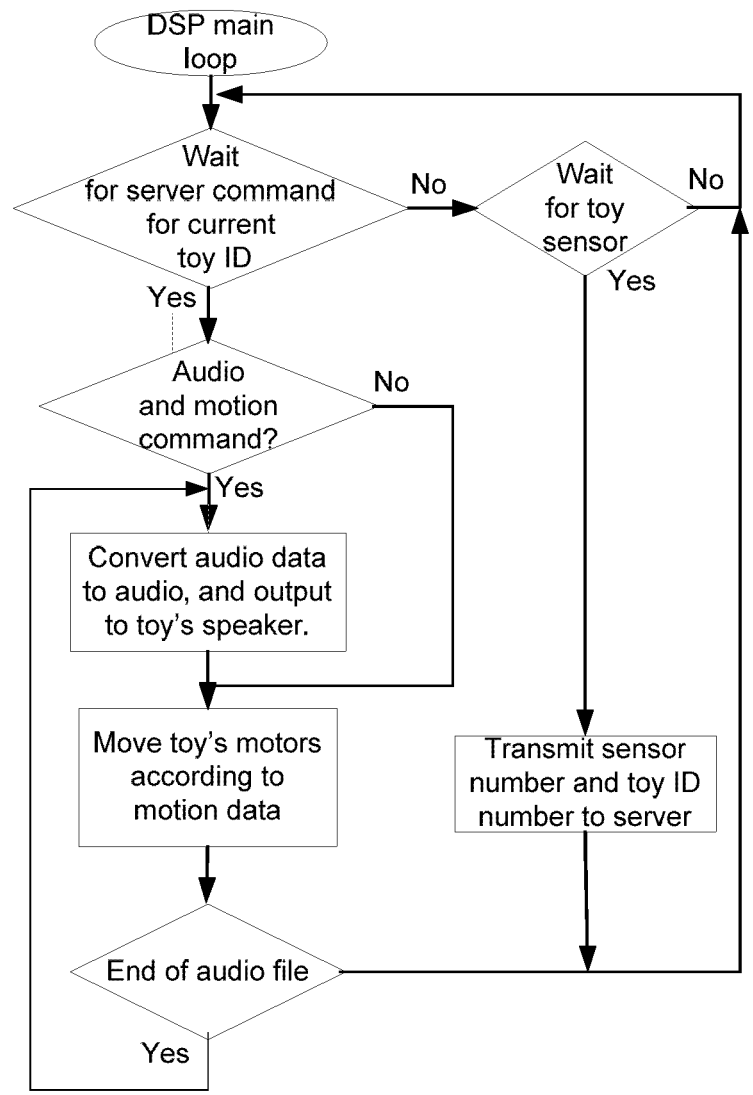
FIG. 33 is a simplified flowchart of an acoustic toy main program.

Reference is now made to FIG. 33, which is a simplified flowchart of an acoustic toy main program, according to one embodiment of the present invention. The acoustic toy main program of FIG. 33 is typically employed in accordance with an acoustic toy system which may be similar to the acoustic toy system described above with reference to FIGS. 28 and 29. An acoustic toy main program is typically run on a suitable DSP unit, which may be similar to DSP unit 106 of FIG. 28, and typically located inside a toy.

Turning to FIG. 33 it is seen that the program awaits a command by a server, for the toy ID in question. Typically, an Internet server such as server 100 of FIGS. 28 and 29 generates a data file for a toy, which data file typically includes both the toy ID of the toy in question, as well as packets of condensed audio data. The data file typically also includes synchronized puppeteering data which is adapted to the specific toy. The data file is then communicated to a handheld device, such as handheld device 98 of FIGS. 28 and 29, which is operative to transmit the data coded within an inaudible acoustic transmission. Alternately or in addition, the handheld device wirelessly transmits the data file to the toy via Bluetooth, WiFi, or IR transmission.

Having received a command file for the toy ID in question, the DSP unit checks whether the file includes both audio and motion content for the toy. If audio data are included, the data are converted to analogue audio using the DSP running a G723 vocoder, and via a digital-to-analogue converter, and provided as an audio output via the toy's speaker. The toy's one or more motors are activated based on the motion data included in the command file.

Typically a command file for the toy has a structure of successive 0.1 second audio packets, each followed by a motion data packet, as described above with reference to FIG. 31. The toy's motions are therefore synchronized with the toy's audio output. This audio conversion and/or toy motor activation continues until the end of the command file, and then the system return to its initial position.

As also seen in FIG. 33, as long as no command file for the toy is received, the system is operative a user input via one or more toy sensors. Once such a sensor is being activated by a user, the sensor's number and the toy's ID number are acoustically transmitted via the toy's speaker, to be received by a handheld device. Alternately the data are being wirelessly transmitted from the toy to the handheld device via Bluetooth, WiFi, or IR transmission. The data are then received and responded to by application which runs on the handheld device or on an Internet server with which the handheld communicates.

It may therefore be appreciated that a DSP unit on an acoustic toy performs a rather simple routine procedure which involves the reception and transmission of relatively simple data and requires no high data rates.

Figure 34:
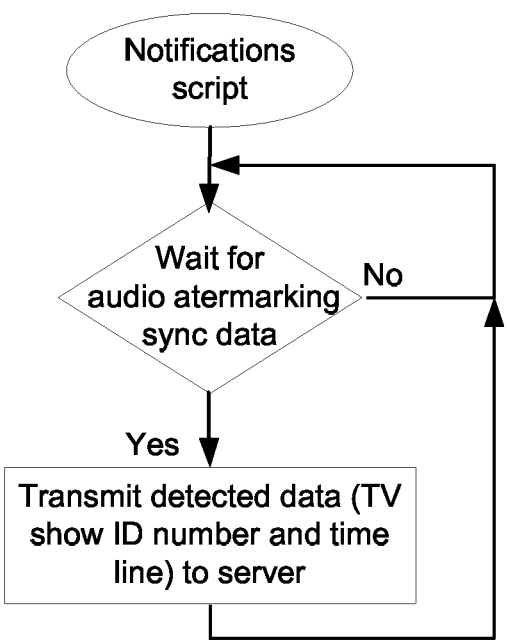
FIG. 34 is a simplified flowchart of a notification script.

Reference is now made to FIG. 34, which is a simplified flowchart of a notification script, according to one embodiment of the present invention.

The notification script of FIG. 34 is typically employed in accordance with an acoustic toy system which include one or more TV shows with encoded data, and which might be similar to the acoustic toy system described above with reference to FIG. 30. A notification script typically runs on a handheld device and/or an Internet server, such as handheld device 98 or server 100 of FIG. 30.

Turning to FIG. 34 it is seen that the system awaits audio watermarking sync data. These data are typically coded into the TV audio of the TV show in question, and spread along the TV audio file, for example, every 0.1 second. The data typically include a TV show ID number and TV time line data, thereby allowing the detection not only of the TV show itself, but also the exact position along the TV show's episode. As the TV show in question is broadcasted, an acoustic transmission by TV-set is received by a handheld device via the device's microphone, and the audio watermarking sync data coded therein are detected by a processor on the device, or communicated to an Internet server to be detected by the server. Having detected the TV show's ID number and time-line data, the handheld device communicates them to the Internet server.

Figure 35:
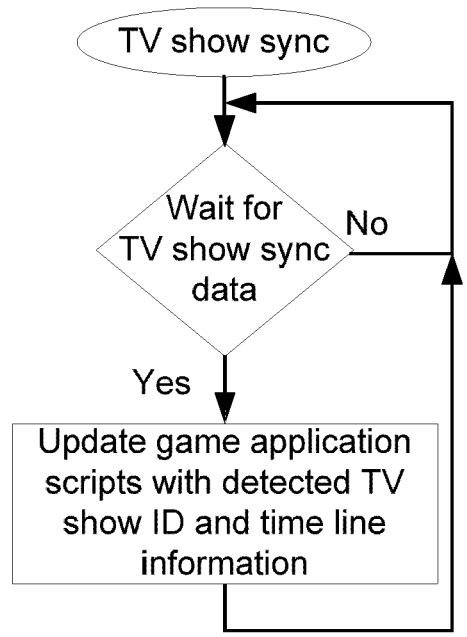
FIG. 35 is a simplified flowchart of a TV show synchronization procedure.

Reference is now made to FIG. 35, which is a simplified flowchart of a TV show synchronization procedure, according to one embodiment of the present invention.

The TV show synchronization procedure of FIG. 35 is typically employed in accordance with an acoustic toy system which include one or more TV shows with encoded data, and which might be similar to the acoustic toy system described above with reference to FIG. 30. A TV show synchronization procedure typically runs on a handheld device and/or an Internet server, such as handheld device 98 or server 100 of FIG. 30.

Turning to FIG. 35 it is seen that an acoustic toy system awaits TV show synchronization data. The data are typically communicated to the system via a handheld device, which detects the data coded in an audio transmission by a TV set. These data are typically spread along the TV audio file, for example, every 0.1 second. The data typically include a TV show ID number and TV time line data, thereby allowing the detection not only of the TV show itself, but also the exact position along the TV show's episode. As the TV show in question is broadcasted, an acoustic transmission by TV-set is received by a handheld device via the device's microphone, and the audio watermarking sync data coded therein are detected by a processor on the device, or communicated to an Internet server to be detected by the server. Having detected the TV show's ID number and time-line data, the handheld device communicates them to the Internet server as described above with reference to FIG. 34.

Having received the TV show synchronization data, the system updates one or more game application scripts for toys, which applications are designed to provide audio and/or motion content for the toys in synchronization with the TV show in question.

Figure 36:
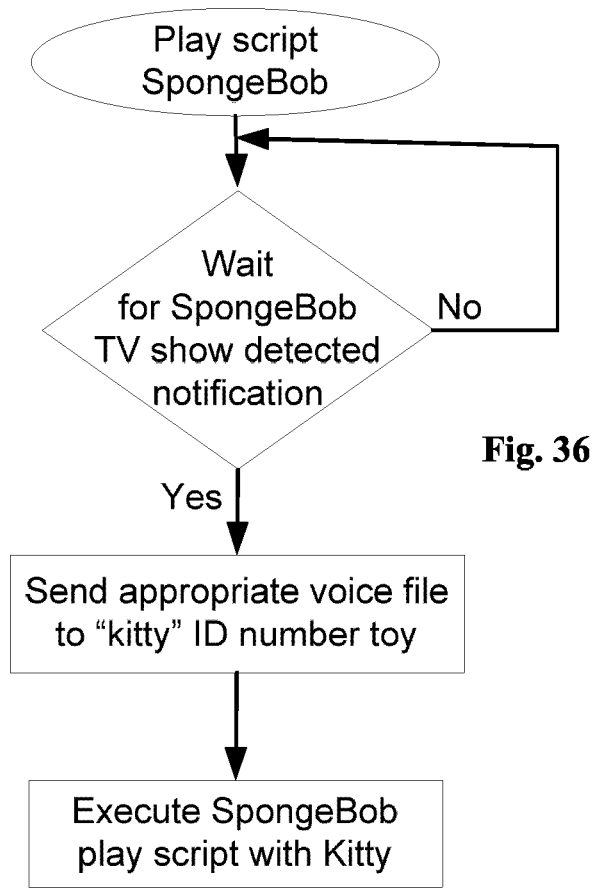
FIG. 36 is a simplified flowchart of TV show play script.

Reference is now made to FIG. 36, which is a simplified flowchart of TV show play script, according to one embodiment of the present invention.

The play script of FIG. 36 is typically employed in accordance with an acoustic toy system which include one or more TV shows with encoded data, and which might be similar to the acoustic toy system described above with reference to FIG. 30. A play script typically runs on a handheld device and/or an Internet server, such as handheld device 98 or server 100 of FIG. 30.

Turning to FIG. 36 it is seen that a system awaits a notification of a particular TV show. The notification is typically being detected via audio watermarking sync data which are coded into the TV show audio, as described above with reference to FIG. 30. Once the TV show's notification has been detected, the system communicates a voice output file to the particular acoustic toy that is supposed to provide the output to the user. For example, an Internet server such as server 100 of FIG. 30 communicates the file to a handheld device such as device handheld device 98 of FIG. 30 or FIG. 32. The output file for the toy typically includes condensed audio data for the toy, a toy ID number of the toy in question, and typically also synchronized puppeteering data for the toy—the toy names "Kitty" in the present example.

The system is then operative to execute the play script via the toy in synchronization with the TV show. Typically, the handheld device acoustically transmits the voice file embedded in a low-volume acoustic transmission in the frequency range of 15-20 KHz, which is inaudible to the human ear, or in any other wireless mean like WiFi or Bluetooth or IR. Toys in the handheld device's vicinity receive the acoustic transmission via suitable microphones. Based on the toy ID number coded into the acoustic transmission, the play script is executed only by the toy to which it is intended.

Figure 37A:
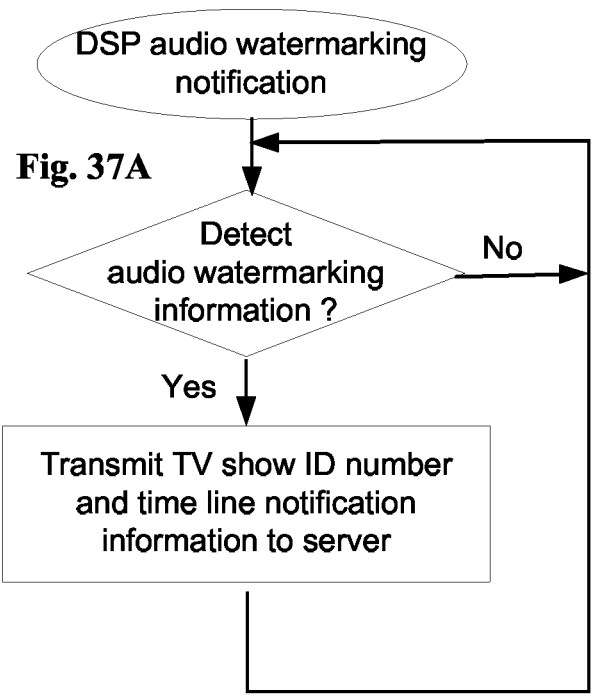
FIG. 37A is a simplified flowchart of a toy notification script.

Reference is now made to FIG. 37A, which is a simplified flowchart of a toy notification script, according to one embodiment of the present invention.

The notification script of FIG. 37A is typically employed in accordance with an acoustic toy system which include one or more TV shows with encoded data, and which might be similar to the acoustic toy system described above with reference to FIG. 30. A notification script typically runs on a DSP unit inside an acoustic toy, such as toy 97 of FIG. 30.

Turning to FIG. 37A it is seen that the system is operative to detect audio watermarking sync data. These data are typically coded into the TV audio of the TV show in question, and spread along the TV audio file, for example, every 0.1 second. The data typically include a TV show ID number and TV time line data, thereby allowing the detection not only of the TV show itself, but also the exact position along the TV show's episode. As the TV show in question is broadcasted, an acoustic transmission by TV-set is received by an acoustic toy device via a microphone on the toy, and the audio watermarking sync data coded therein are detected by a DSP unit on the toy. Having been detected by the DSP unit, the TV show's ID number and time-line data are typically acoustically transmitted via the toy's speaker, to be received by a handheld device such as device 98 of FIG. 30. Alternately the data are being wirelessly transmitted from the toy to the handheld device via Bluetooth, WiFi, or IR transmission. The handheld device then typically communicates the data to an Internet server.

Figure 37B:
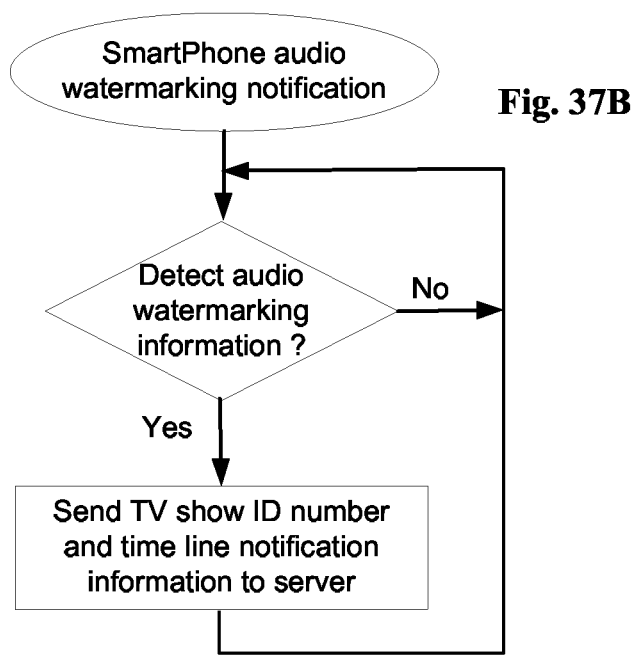
FIG. 37B is a simplified flowchart of a phone notification script.

Reference is now made to FIG. 37B, which is a simplified flowchart of a phone notification script, according to one embodiment of the present invention.

The notification script of FIG. 37B is typically employed in accordance with an acoustic toy system which include one or more TV shows with encoded data, and which might be similar to the acoustic toy system described above with reference to FIG. 30. A notification script typically runs on a handheld device, such as device 98 of FIG. 30.

Turning to FIG. 37B it is seen that the system is operative to detect audio watermarking sync data. These data are typically coded into the TV audio of the TV show in question, and spread along the TV audio file, for example, every 0.1 second. The data typically include a TV show ID number and TV time line data, thereby allowing the detection not only of the TV show itself, but also the exact position along the TV show's episode. As the TV show in question is broadcasted, an acoustic transmission by TV-set is received by a handheld device via the device's microphone, and the audio watermarking sync data coded therein are detected by a processor on the device, or communicated to an Internet server to be detected by the server. Having detected the TV show's ID number and time-line data, the handheld device communicates them to the Internet server.

Figure 38:
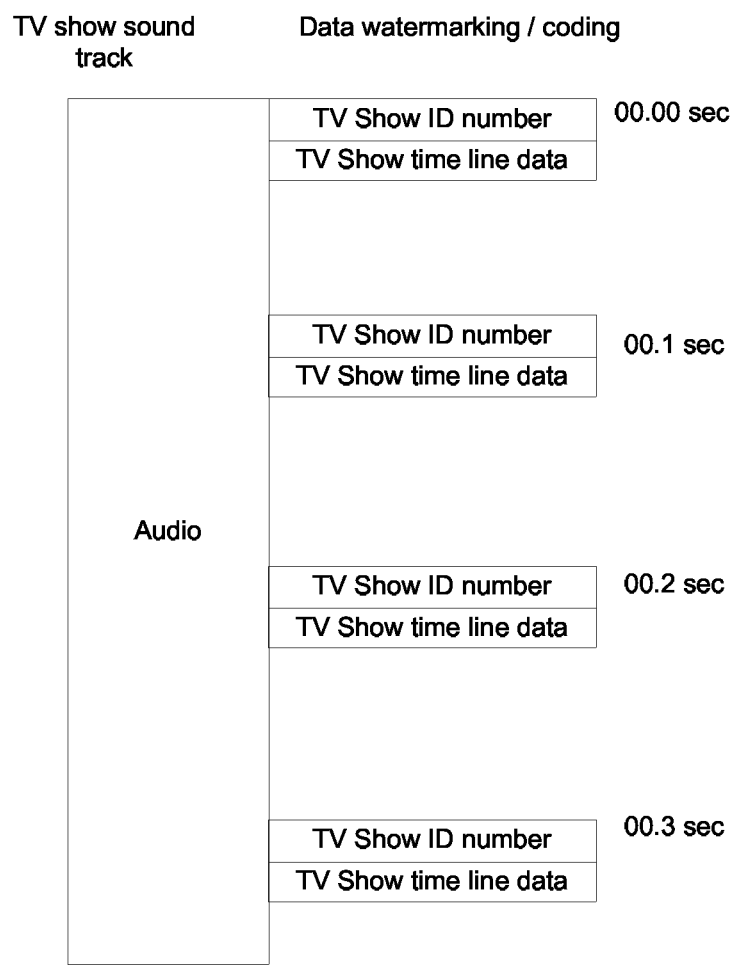
FIG. 38 is a simplified block-diagram of a TV show sound track.

Reference is now made to FIG. 38, which is a simplified block-diagram of a TV show sound track, according to one embodiment of the present invention.

The TV show sound track of FIG. 38 is typically employed in accordance with an acoustic toy system which include one or more TV shows with encoded data, and which might be similar to the acoustic toy system described above with reference to FIG. 4.

Turning to FIG. 38, it is seen that a TV show sound track includes a watermarking and/or coding of a TV show ID number, which is repeated every 0.1 second along the sound track. The TV show sound track also includes a watermarking and/or coding of the TV show time line data, namely data of the location of a current position along the TV show sound track. The TV show sound track is typically acoustically transmitted by a TV set via the TV-set's speaker, and received by an acoustic toy system via a suitable microphone on a handheld device and/or an acoustic toy which wirelessly communicates with a handheld device.

If the TV-set's acoustic transmission is received by a toy, the TV-show data coded therein are detected by the DSP unit the toy. A notification is then transmitted acoustically or via other means of wireless transmission such as Bluetooth or WiFi, from the toy to a handheld device, which communicates the notification to a suitable Internet server. It is appreciated that this data transmission from the toy to the handheld device does not involve high data rates. Alternately, the acoustic transmission by the TV-set is received directly by a handheld device, and the TV-show data coded therein are detected by a processor on the device. Still another option is that the acoustic transmission by the TV-set is received by the Internet server via the microphone on the handheld device.

It is appreciated that employing the sound track of FIG. 38, an acoustic toy system can detect the broadcast of a particular TV show at any particular time point along the TV show's timeline (with a 0.1 second resolution). Similarly, the acoustic toy system can detect any particular time point along the TV show's timeline (with a 0.1 second resolution). It is therefore appreciated that employing the sound track of FIG. 38, the acoustic toy system of FIG. 30, is operative to activate a toy to respond to a TV-show and to provide both verbal and motion output which is synchronized with the TV-show's content.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for remotely controlling a device, the method comprising:
providing at least one service providing device, at least one intermediating switch operative to control at least one of said service providing device within a second range, and at least one mobile device communicatively coupled with said intermediating switch within a first range, wherein said second range is smaller than said first range;
wherein said mobile device is operative to interrogate said at least one intermediating switch;
responsive to said interrogation by said mobile device, said intermediating switch identifying said at least one service providing device to said mobile device;
presenting to a user of said mobile device a list comprising at least one of said service providing devices within said second range; and
using acoustic communication for said interrogation, wherein said acoustic communication is used by at least one of said service providing device and said mobile device.

2. The method of claim 1, additionally comprising:
using a first wireless communication technology, by at least one mobile device and said at least one service providing device, for communicating within said first range; and
using a second wireless communication technology for communicating within said second range,
wherein said second wireless communication technology is different from said first wireless communication technology.

3. The method of claim 1, wherein said step of using acoustic communication uses at least one of:
a speaker embedded in said at least one of said intermediating switch and said mobile device and wherein said speaker is used to provide audible sound to a user; and
a microphone embedded in said at least one of said intermediating switch and said mobile device and wherein said microphone is used to receive audible sound from a user.

4. The method of claim 1, wherein said control of at least one of said service providing devices by said intermediating switch is conditioned by said service providing device being interrogated by said same mobile device.

5. The method of claim 1, additionally comprising:
said intermediating switch communicating with a third communication device using at least one of RF communication technology, wireless communication technology, power-line communication technology, and infra-red communication technology.

6. The method of claim 1, additionally comprising:
providing a plurality of service providing devices each associated with a respective location;
presenting to a user at least one of said locations;
receiving from a user a selection of a location; and
presenting to said user a list of service providing devices associated with said location.

\* \* \* \* \*